A. A. HORTON.
ADDING MACHINE.
APPLICATION FILED JULY 31, 1911. RENEWED MAY 15, 1919.
1,323,475.
Patented Dec. 2, 1919.
18 SHEETS—SHEET 16.
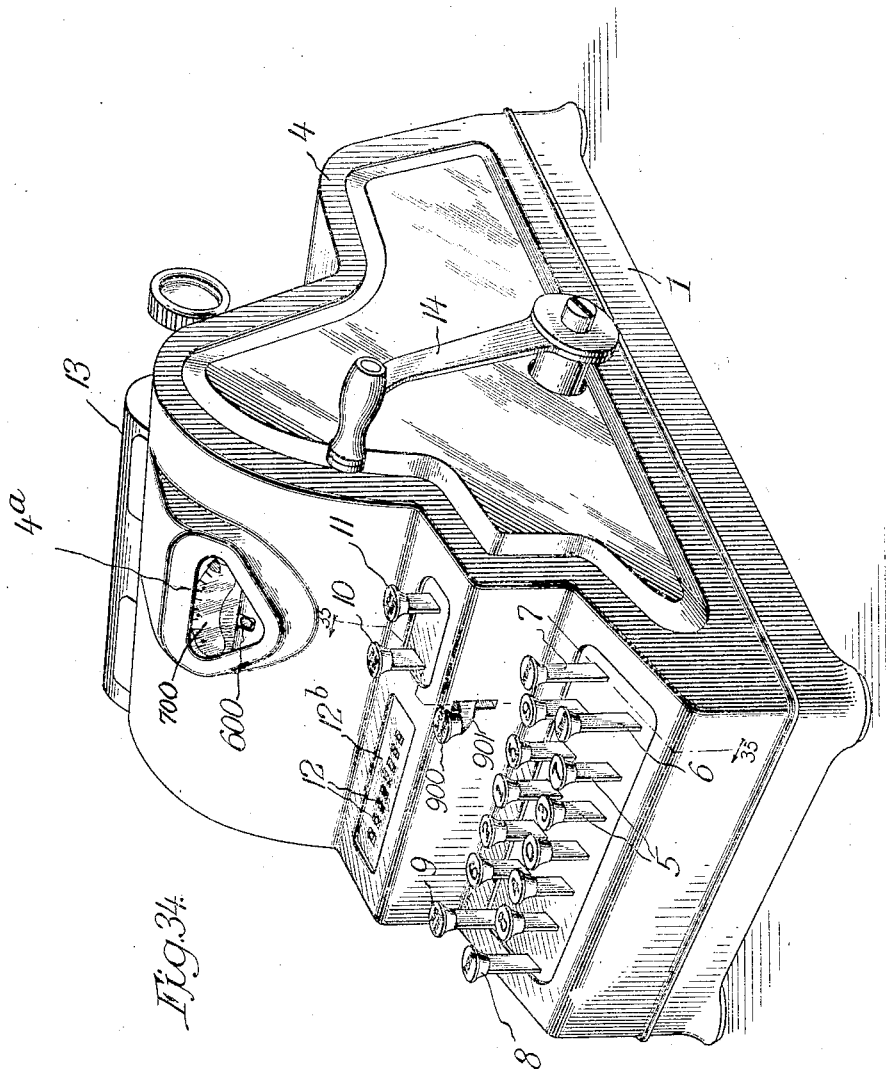

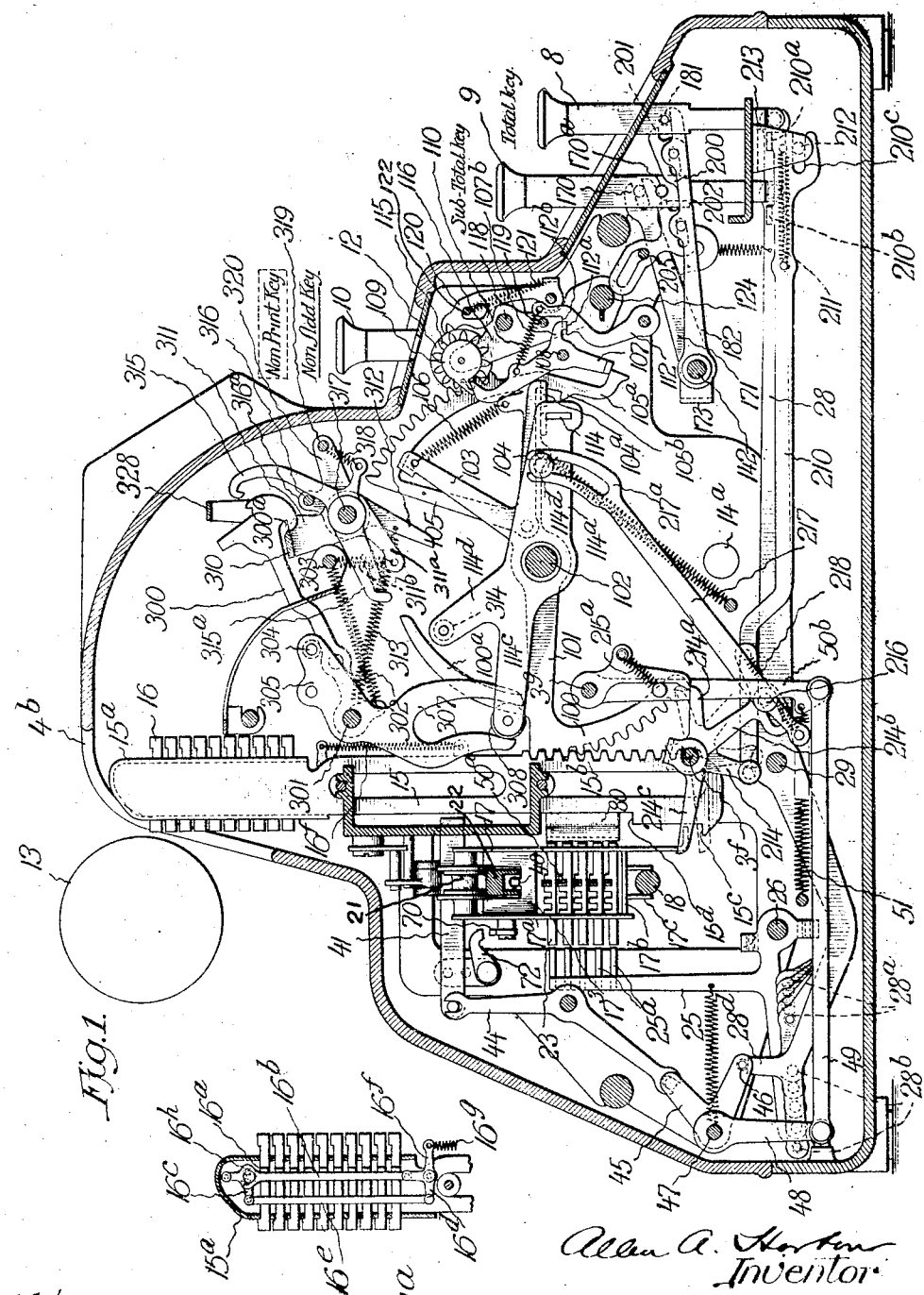

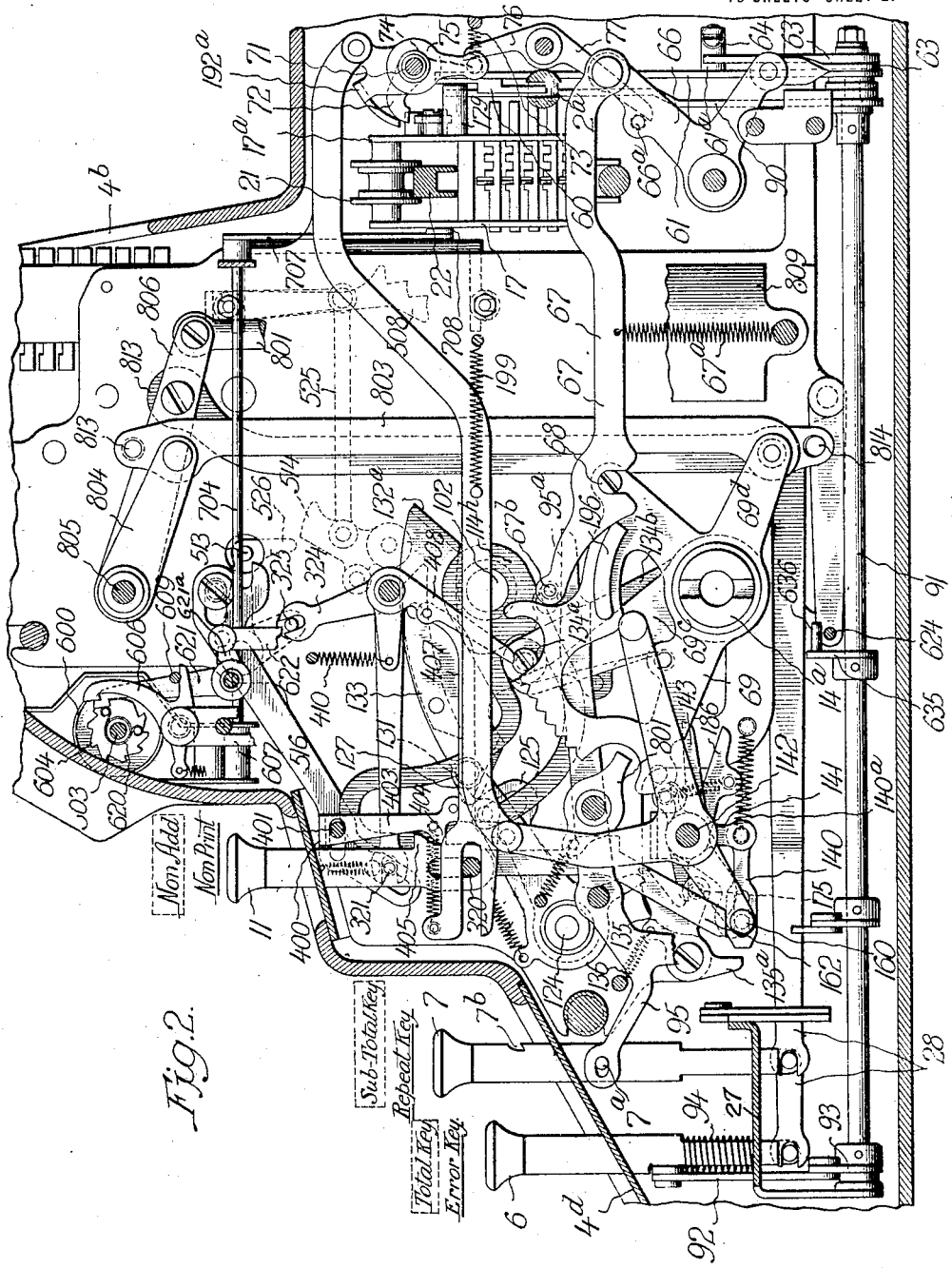

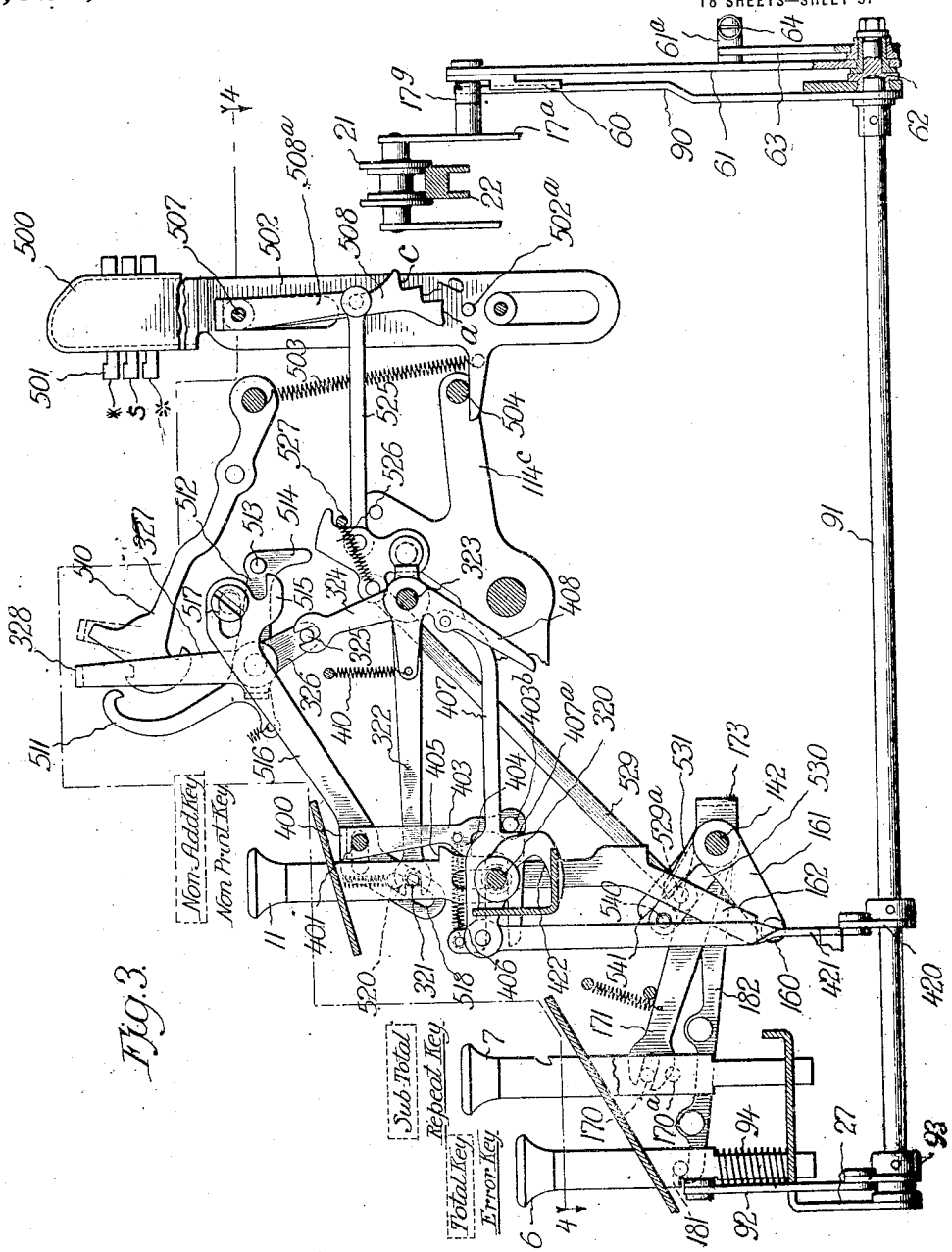

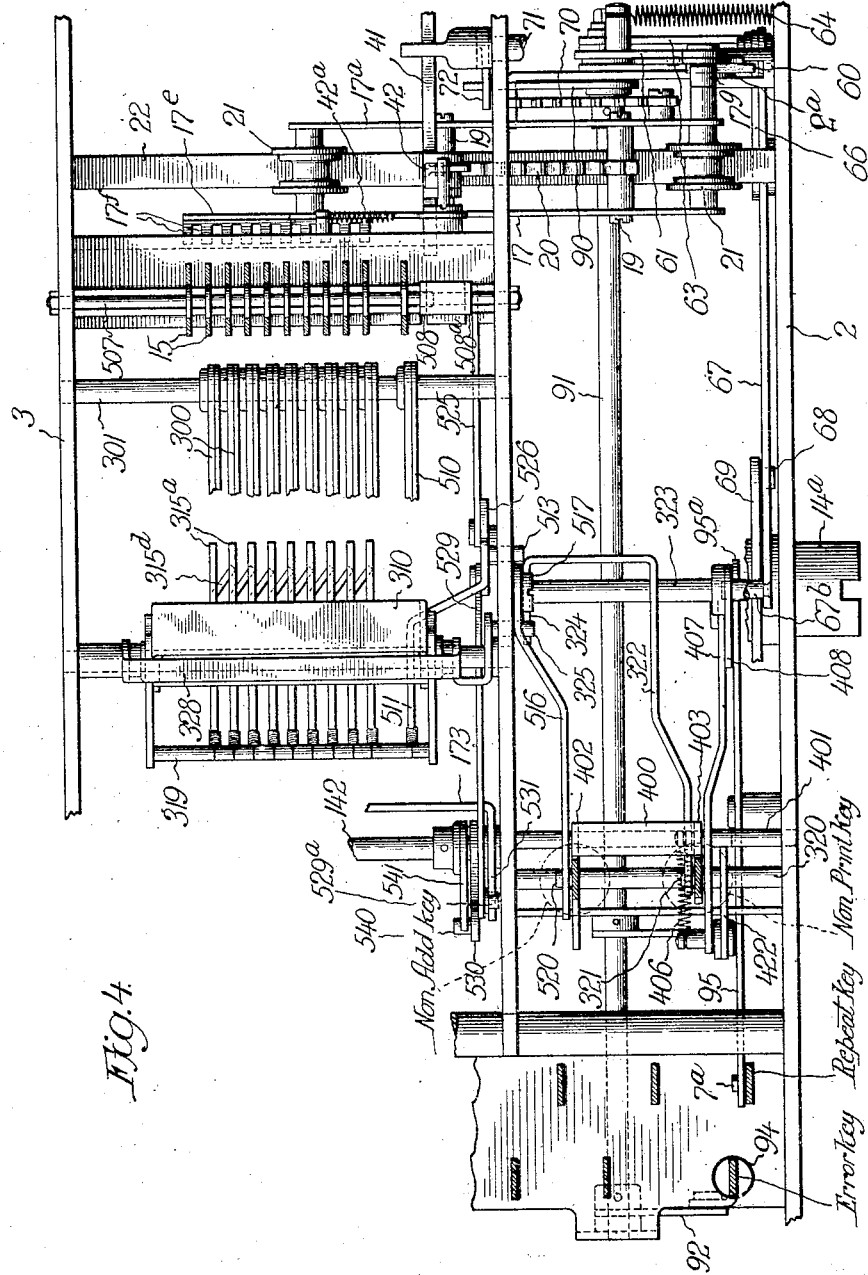

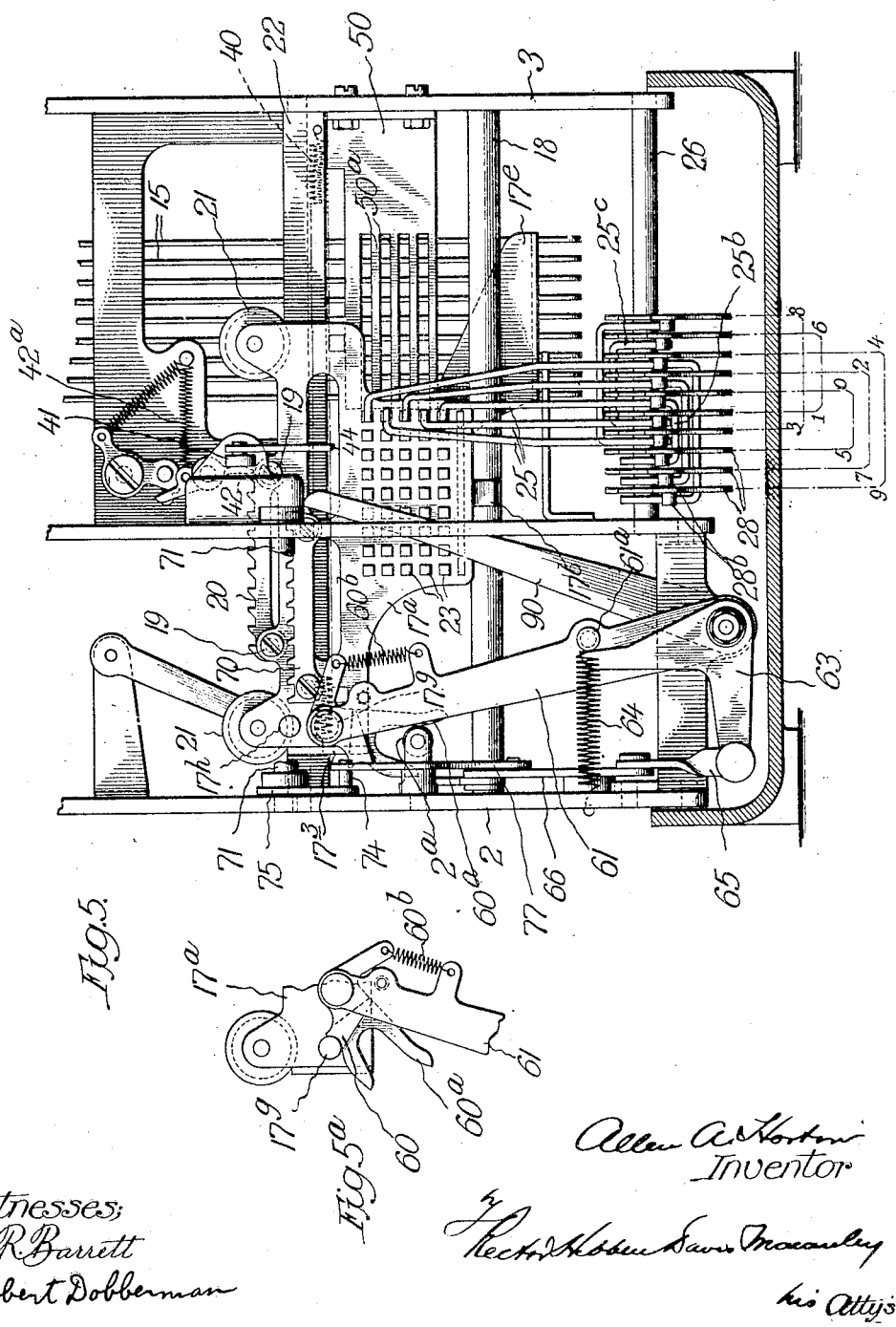

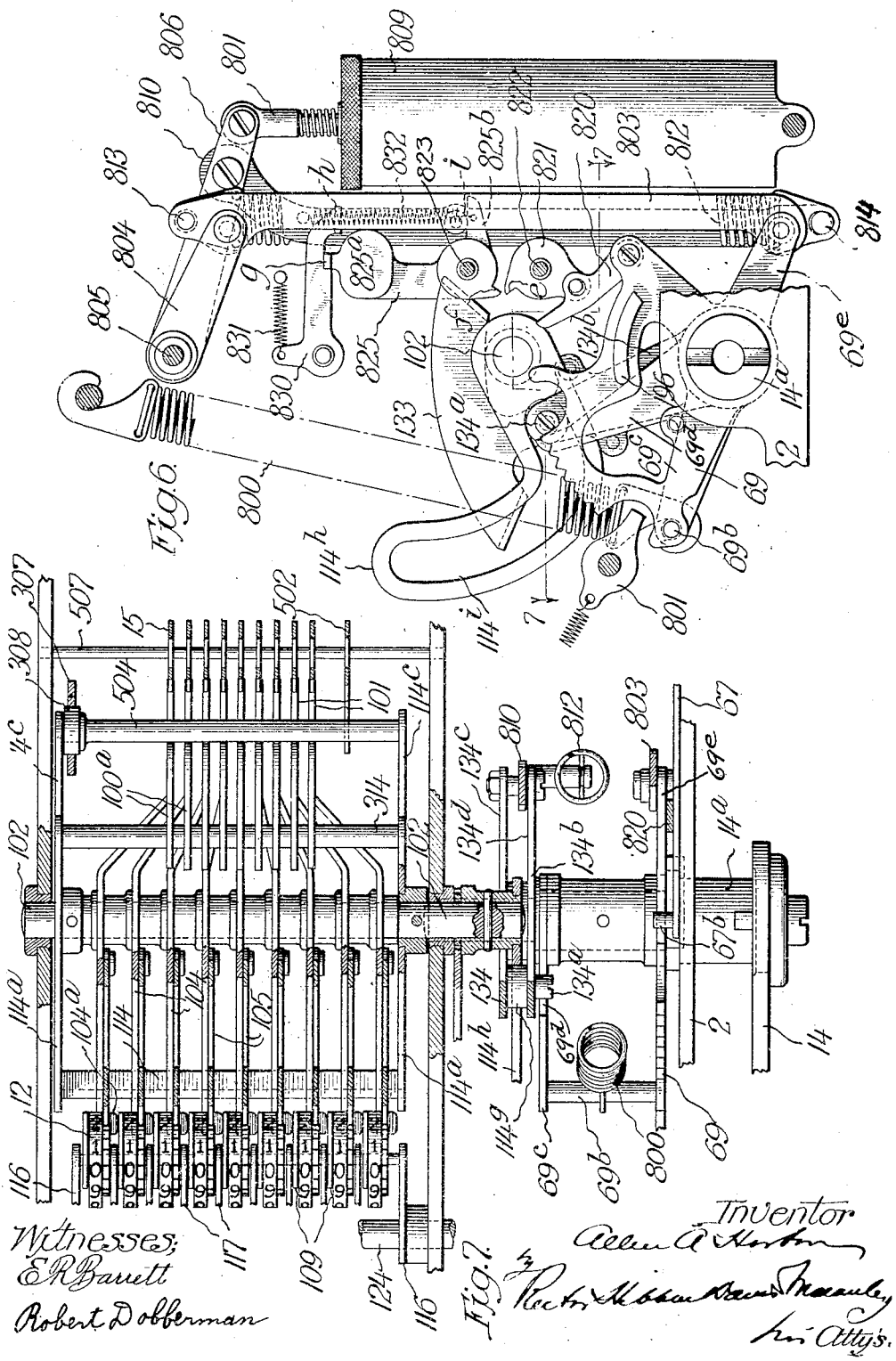

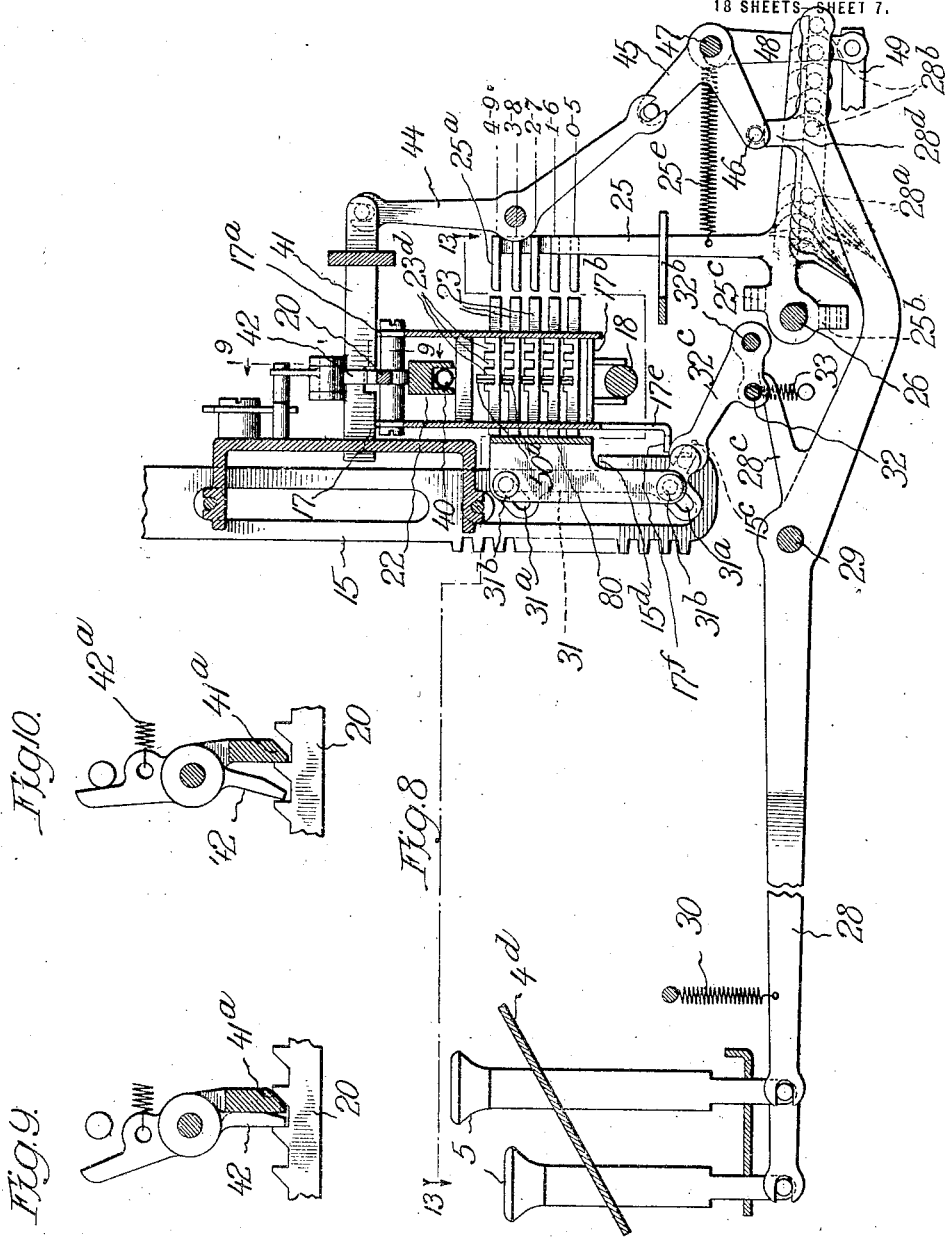

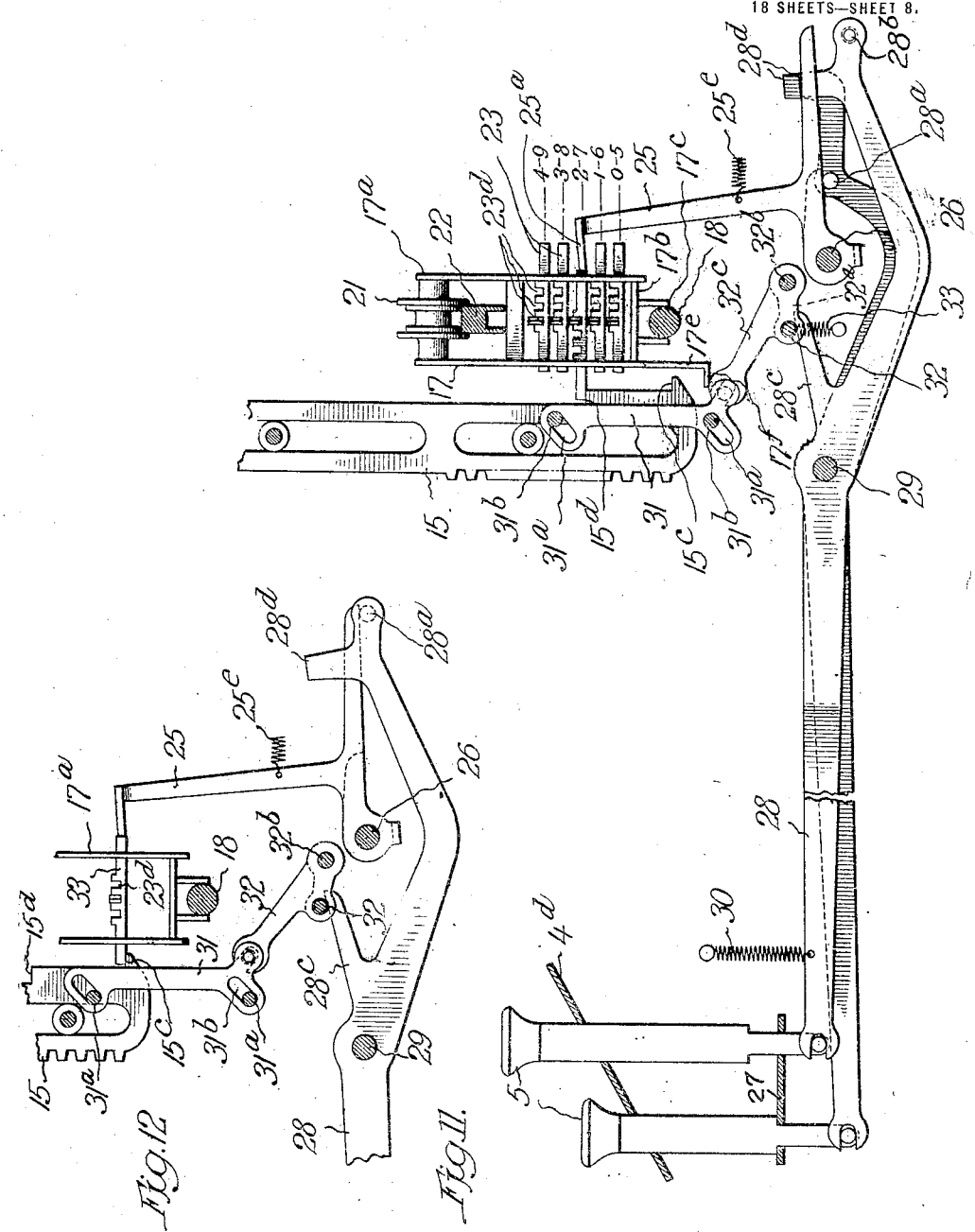

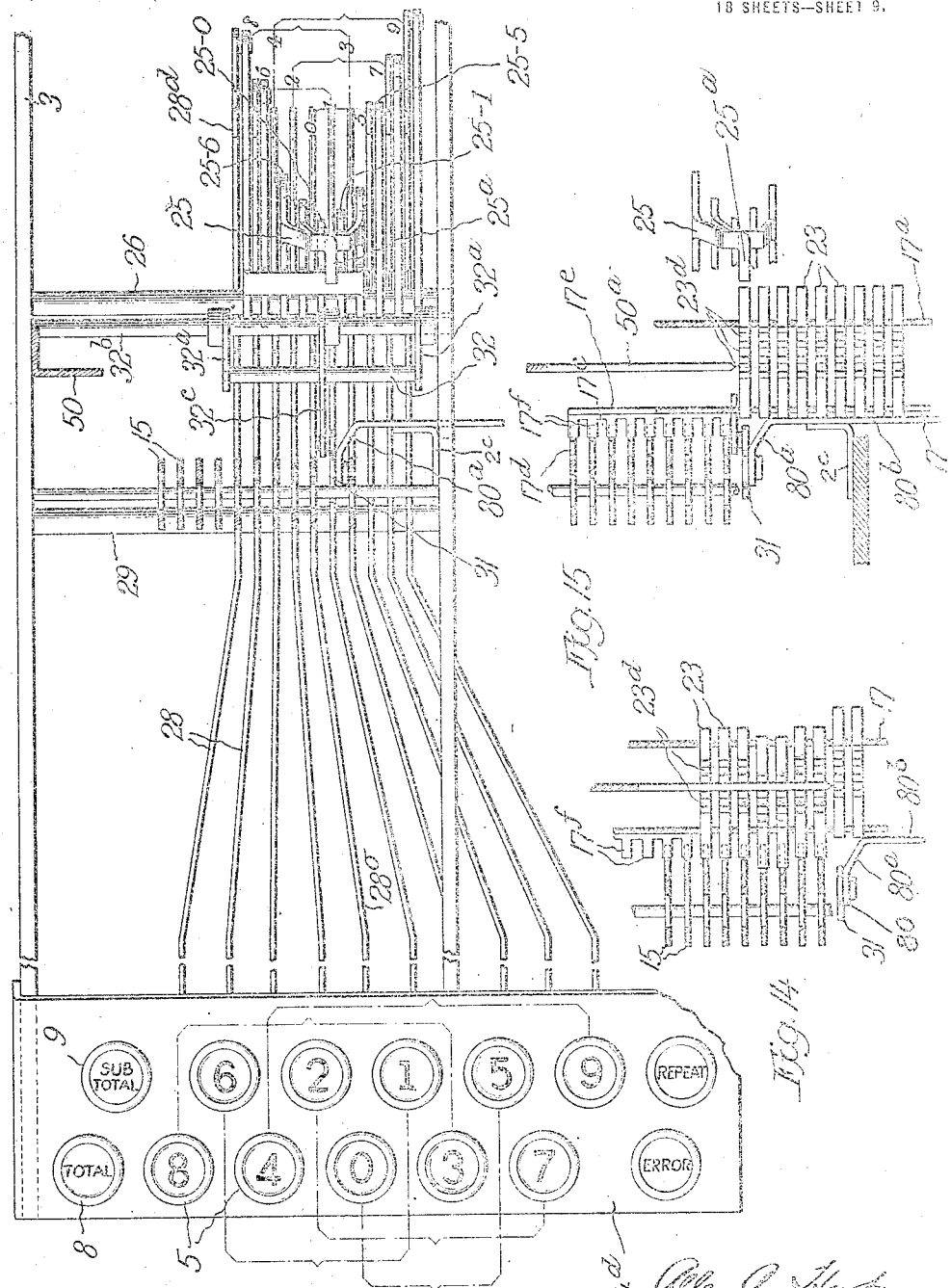

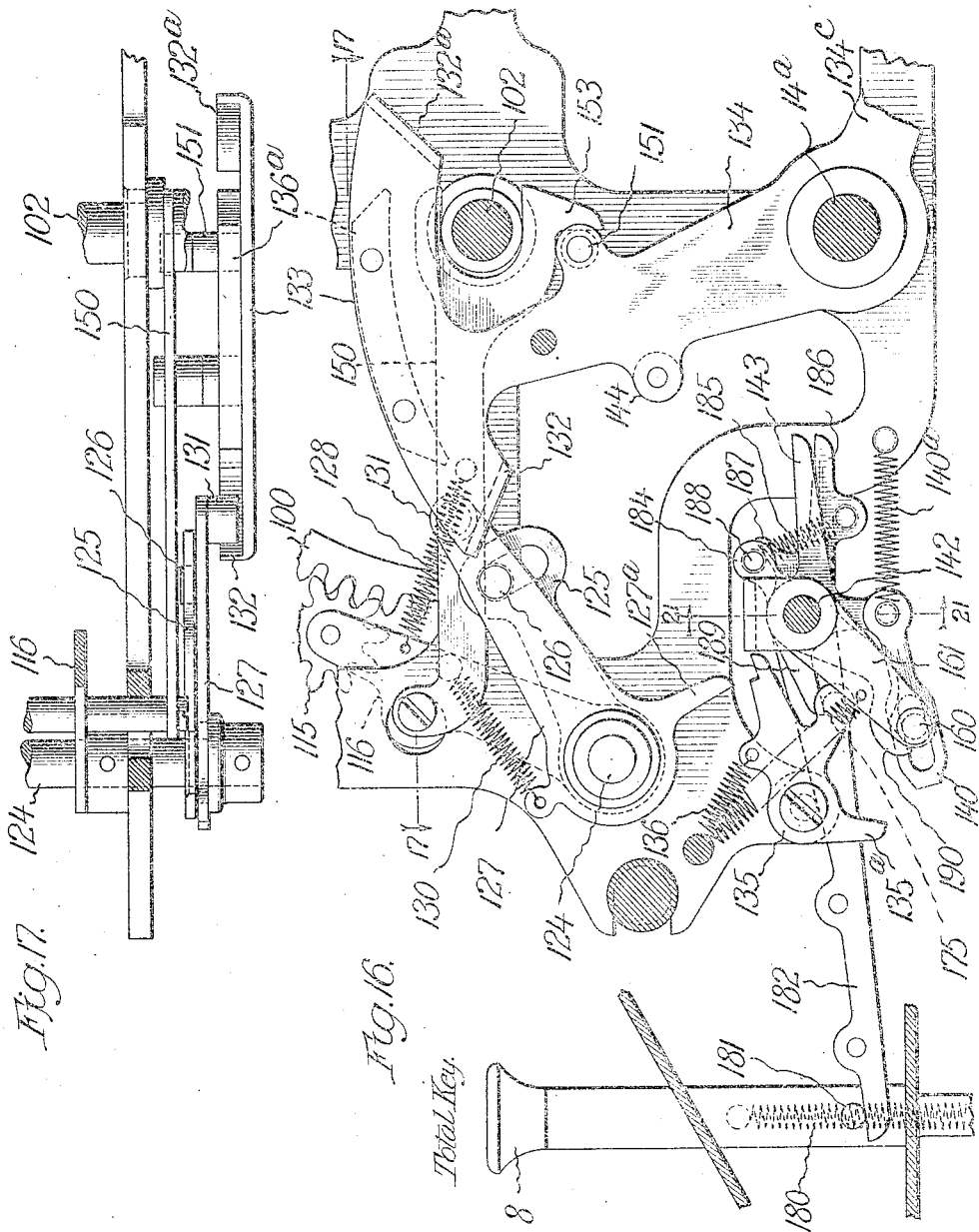

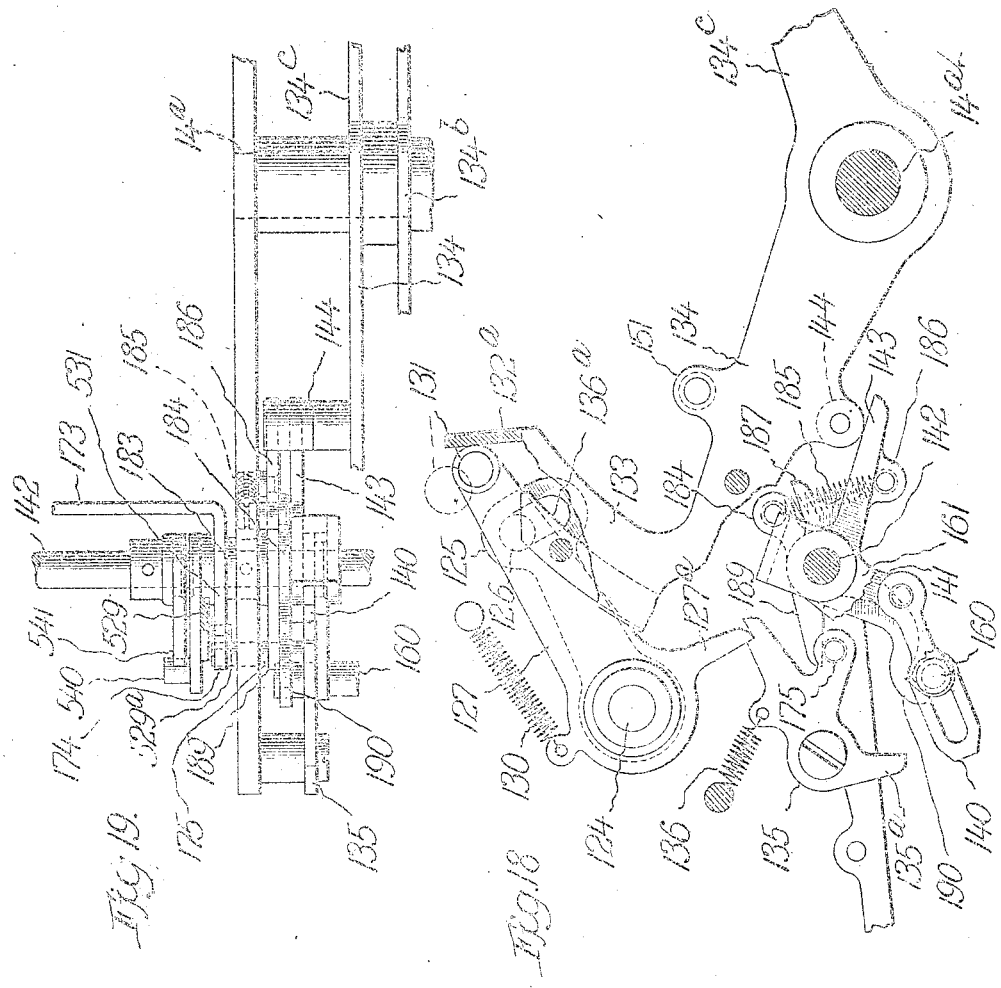

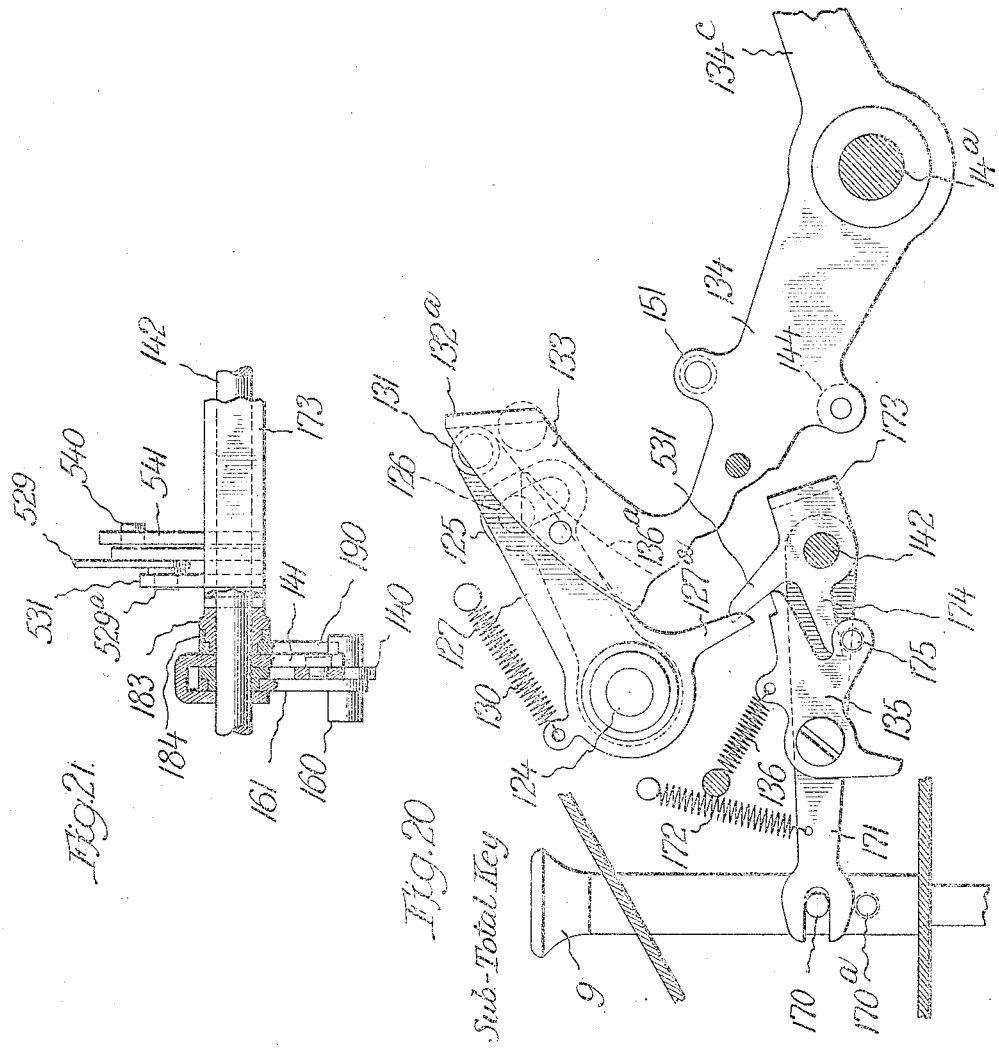

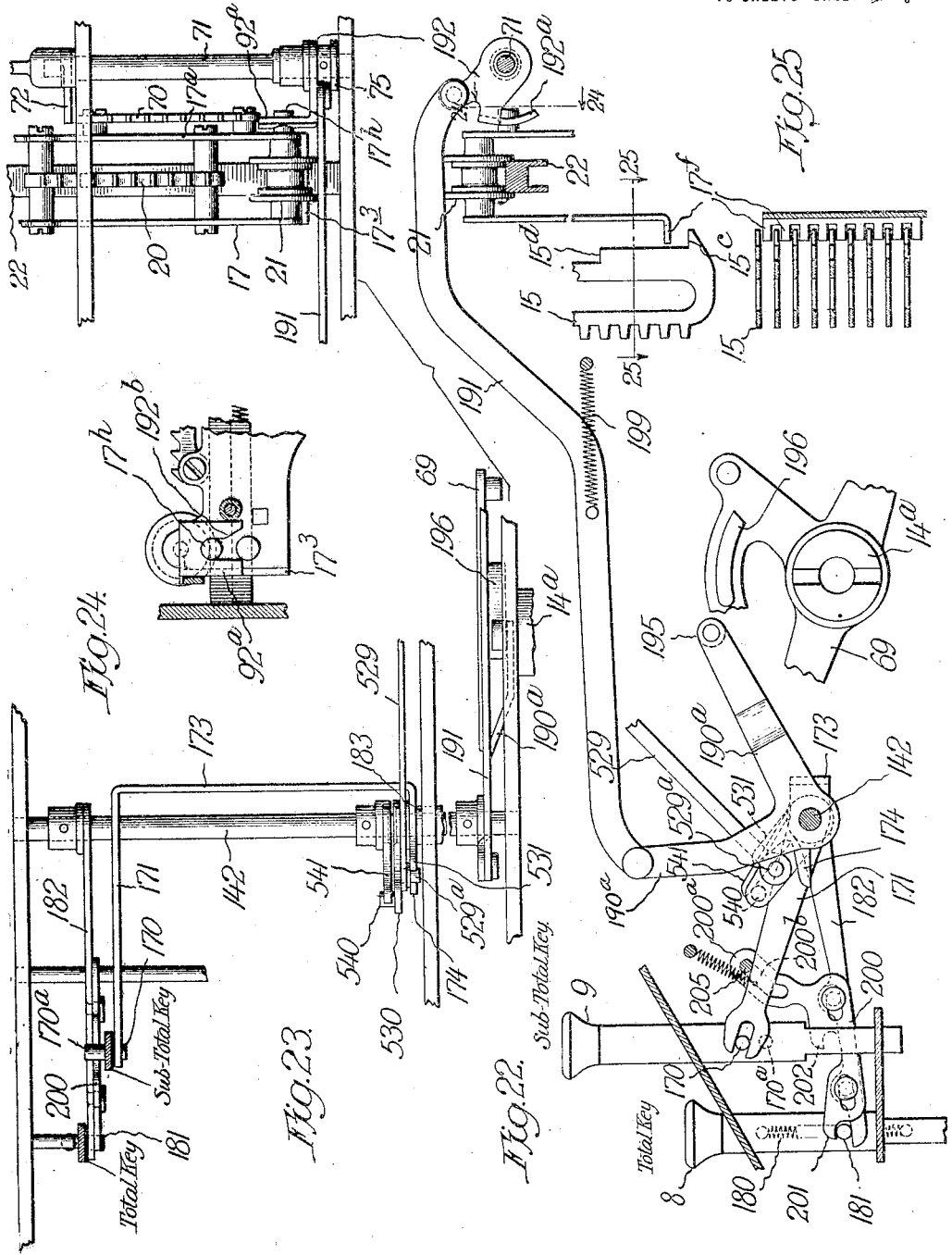

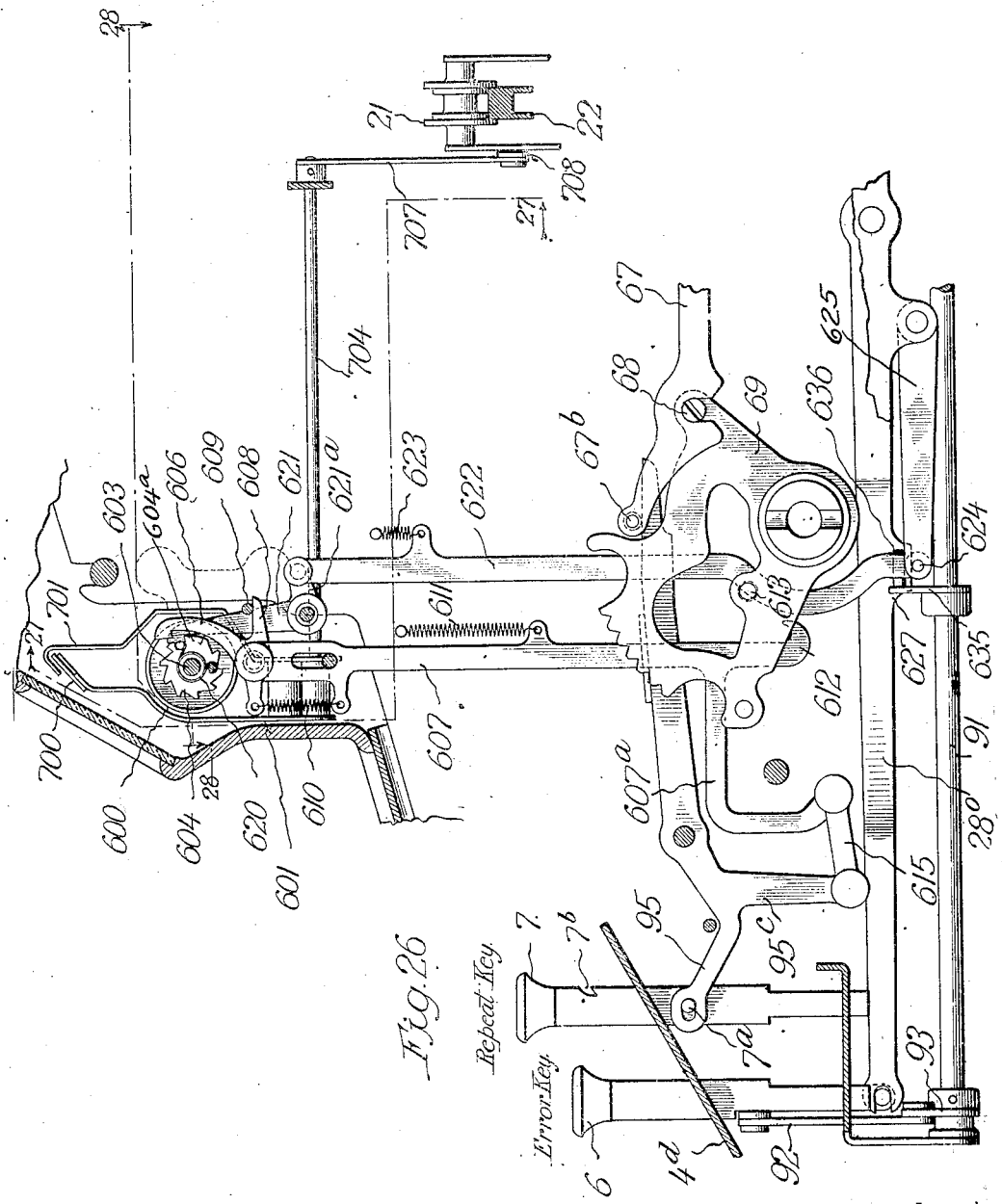

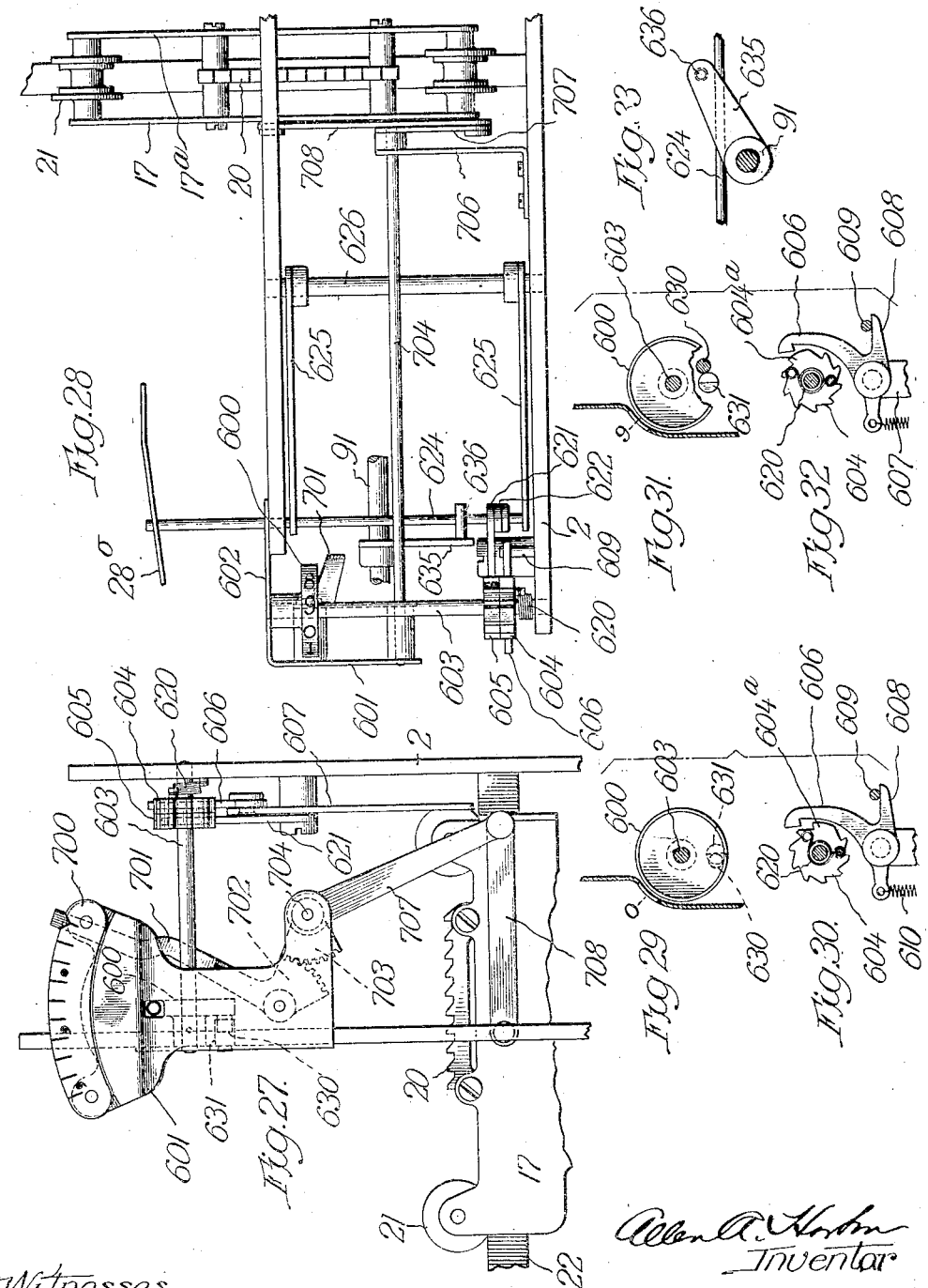

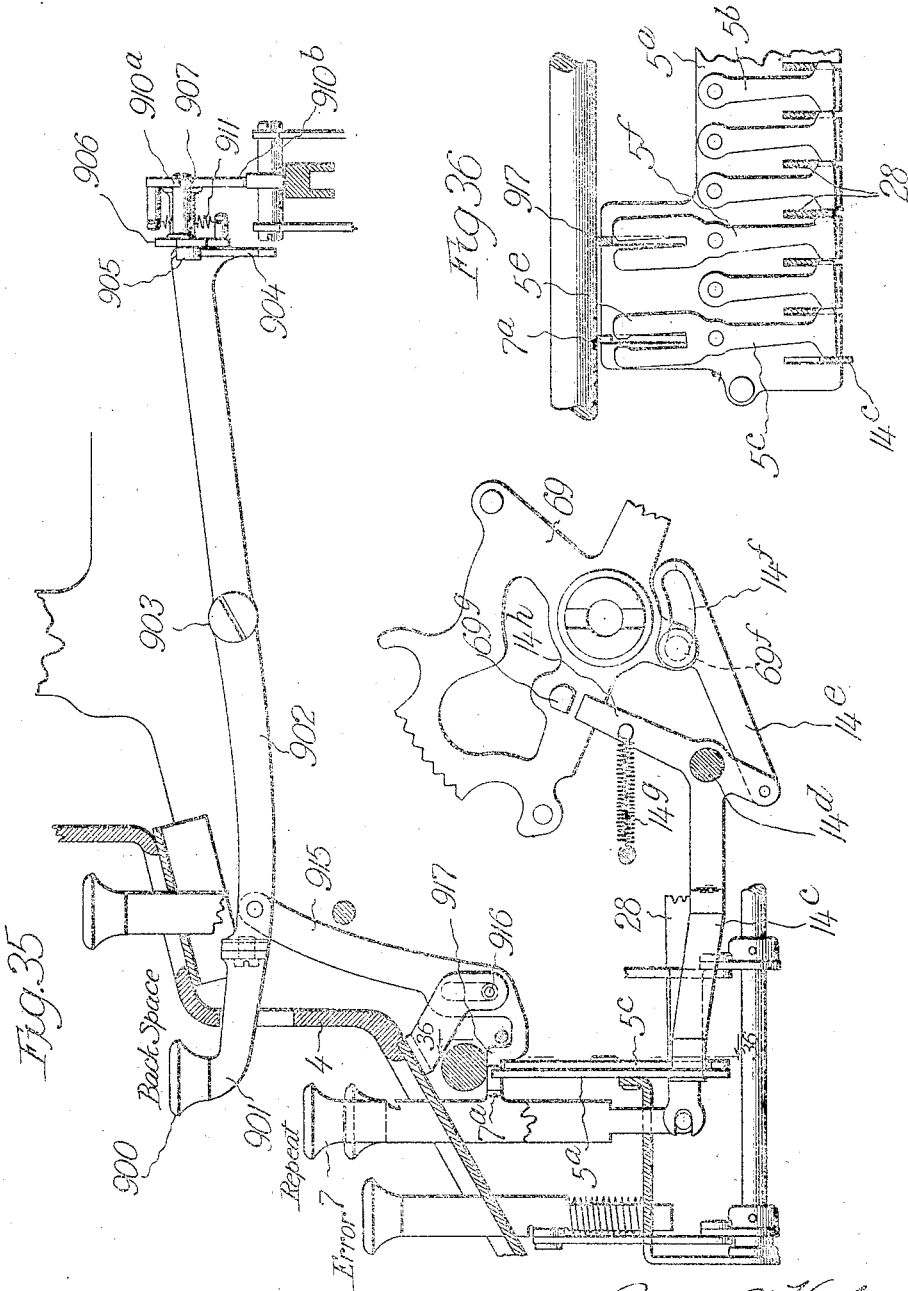

A. A. HORTON.
ADDING MACHINE.
APPLICATION FILED JULY 31, 1914. RENEWED MAY 15, 1919.
1,323,475.
Patented Dec. 2, 1919.
18 SHEETS—SHEET 18.
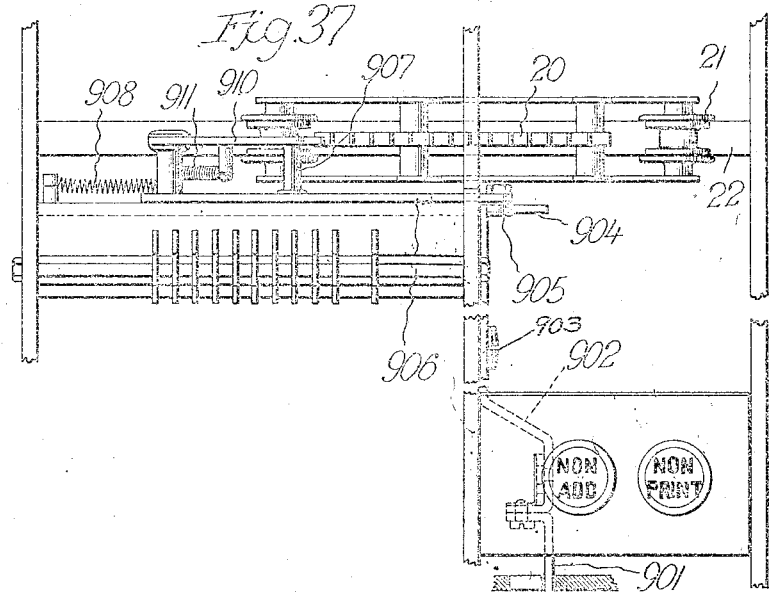
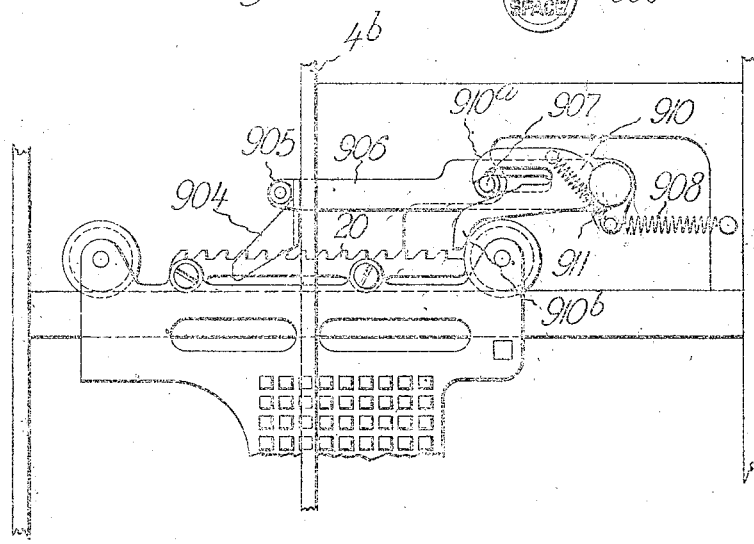

UNITED STATES PATENT OFFICE.

ALLEN A. HORTON, OF DETROIT, MICHIGAN, ASSIGNOR TO BURROUGHS ADDING MACHINE COMPANY, OF DETROIT, MICHIGAN, A CORPORATION OF MICHIGAN.

ADDING-MACHINE.

1,323,475.

Specification of Letters Patent.

Patented Dec. 2, 1919.

Application filed July 31, 1911, Serial No. 641,455. Renewed May 15, 1919. Serial No. 297,436.

*To all whom it may concern:*

Be it known that I, ALLEN A. HORTON, a citizen of the United States, residing at Detroit, in the county of Wayne and State of Michigan, have invented a certain new and useful Improvement in Adding-Machines, of which the following is a specification.

The present invention relates to that type of adding machine commonly termed a "ten-key" machine for the reason that, as distinguished from an adding machine which has a series of keys for each order or denomination, the type of machine in question employs but a single set or series of denominational keys, this same set or series serving for successive numerical orders or denominations through the agency of an intermittently and progressively shifting carriage having sets or series of stops for the different numerical orders or denominational places.

One object of the present invention is to supply a machine of the above specified type which, while fully equipped for performing the customary functions of the present-day adding machine such as listing, adding, totaling, sub-totaling, repeating, printing without adding and adding without printing, may be of reduced size and weight as compared with most adding machines. A leading characteristic of the present machine which makes for reduction in size and number of parts, is the employment of half the number of stops ordinarily found necessary in the shifting carriage. Thus in a machine having what is known in the art as a nine-bank capacity, meaning nine numerical orders or denominational places, where ordinarily nine series each comprising ten stops would be mounted in the shifting carriage, making a total of ninety stops, the present invention makes it possible to obtain the same results with nine sets or series each composed of but five stops making a total of forty-five. This is accomplished in the machine presently to be described, by having the keys coöperate with the stops in pairs, one key of a pair moving the associated stop to a greater extent than the other key of the pair, and the coöperating reciprocatory accounting element having stepped abutment shoulders so that the stop measures the excursion of the accounting element by engagement with one such shoulder when one key of a pair is operated and by engagement with the other shoulder when the other key of a pair is operated, the two shoulders being spaced apart a distance representing five steps in an order of numerals.

Various other characteristic features of the present invention making for compactness of assemblage, convenience in manipulating, and accuracy and uniformity in operation will become apparent as the detailed description of the present form of embodiment of the invention proceeds.

In the accompanying drawings, Figure 1 represents a complete left side sectional elevation of the machine; Fig. 1ª is a sectional detail of a type carrier; Fig. 2 is a right side sectional elevation with some of the control mechanism removed. Fig. 3 is a similar view illustrating more in detail some of the same parts and omitting others; Fig. 4 is a sectional top plan view, taken on the line 4—4 of Fig. 3, illustrating further the parts appearing in Fig. 3; Fig. 5 is a sectional rear elevation of the machine; Fig. 5ª is a detail, showing a changed relationship of certain parts in Fig. 5; Fig. 6 is a detail side elevation of the said control mechanism; Fig. 7 is an axial section on the line 7—7 of Fig. 6, being extended beyond what appears in Fig. 6 to show some of the associated accumulating mechanism; Fig. 8 is a detail right side view, illustrating certain indexing mechanism as at normal; Figs. 9 and 10 are details of an escapement pawl, being sections taken on the line 9—9 of Fig. 8; Fig. 11 is a similar view to Fig. 9, illustrating the effect of depressing the "2" key. Fig. 12 illustrates another changed condition of said parts, as when depressing the "7" key; Fig. 13 is a sectional top plan view of the parts appearing in the latter figures and is taken on the line 13—13 of Fig. 8; Figs. 14 and 15 are similar fragmentary views showing changed relation of parts; Fig. 16 is an enlarged detail side elevation showing the effect of depression of total key; Fig. 17 is a plan section taken on the line 17—17 of Fig. 16; Fig. 18 is a similar view to Fig. 16 illustrating a changed condition, *i. e.*, as when the handle has reached its forward limit with the total key depressed; Fig. 19 is a detail plan view of parts appearing in Fig. 18; Fig. 20 is another similar view, with the sub-total key depressed and the handle at its forward limit; Fig. 21 is an axial section taken on the line 21—21 of Fig. 16; Fig. 22 is a detail side view showing totaling and stop carrier connections and the effect of the former upon the latter by the depression of the total key; Fig. 23 is a detail plan view of the same parts; Fig. 24 is a detail rear end section taken on the line 24—24 of Fig. 22; Fig. 25 is a detail plan section taken on the line 25—25 of Fig. 22; Fig. 26 is a sectional elevation somewhat similar to Fig. 2 including some parts not there illustrated and omitting others; Fig. 27 is a sectional elevation on line 27—27 of Fig. 26; Fig. 28 is a sectional plan on line 28—28 of Fig. 26; Figs. 29 to 33 are sectional details of parts appearing in Figs. 26 to 28; Fig. 34 is a perspective of the complete machine incased; Fig. 35 is a sectional right side elevation taken substantially on the line 35—35 of Fig. 34 though not carried all the way through the machine; Fig. 36 is a fragmentary cross section taken substantially on the line 36—36 of Fig. 35; Fig. 37 is a fragmentary top plan view somewhat similar to Fig. 28 but showing some additional devices and not including all that is in Fig. 28; Fig. 38 is a partial rear elevation embracing the same structure that is illustrated in Fig. 37.

*External make-up.*

The exterior of the machine comprises a base casting 1 on which are erected side frame pieces 2 and 3 for supporting the interior structure; and an inclosing case 4 resting upon the base and having glass panels at the sides and a keyboard panel at the lower front portion where the casing slopes as illustrated most graphically in Fig. 34. Amount keys 5 protrude through this portion of the casing and are arranged in two crosswise series of five each making a total of ten keys which are numbered from zero to nine. "Error" and "repeat" keys 6 and 7 protrude to the right of the amount keys and total and subtotal keys, 8 and 9 protrude to the left of the amount keys, this general relative location of keys being the most familiar to users of adding machines. A short distance in rear of the above designated keys the casing has a vertical wall and above that a slightly sloping division paneled for special keys and accumulator "non-add" and "non-print" keys 10 and 11 protruding through the right-hand panel and accumulator wheels 12 showing through the left-hand panel. The upper part of the casing is arched symmetrically and has a centrally located bulging portion 4$^a$ paneled in triangular outline, a decimal place indicator and an operation counter showing through this panel. Just in rear of the top arched portion of the casing is suitably mounted a roller platen 13 adjacent an opening 4$^b$ in the casing through which type carriers hereinafter described may rise to present their type at the printing position. The operating crank handle 14 is located at the right as usual and detachably connected to its shaft.

*Setting up mechanism.*

The reciprocatory accounting elements are in the form of vertical slide bars 15, Figs. 1 to 5, 6, 8 and 11, suitably guided for rectilinear movement, flanged throughout their upper portions to constitute housings 15$^a$ for type bars 16, and formed as racks 15$^b$ at their lower front portions. The lower rear portions of these slide bars have the stepped shoulders which coöperate with the stops of the shifting carriage, as already mentioned in the opening statement. Thus at the lower end of each slide bar there is a horizontal shoulder 15$^c$ and upwardly therefrom a distance corresponding with five numerical steps there is a similar shoulder 15$^d$ stepped forwardly with relation to the shoulder 15$^c$. The shifting carriage comprises front and rear plates 17 and 17$^a$ connected by a bottom plate 17$^b$ which has guiding ears 17$^c$ straddling a frame cross rod 18. The top portions of these plates are tied together by clamping screws 19 which also secure in position an escapement rack 20, Figs. 4 and 5. Between the upper end portions of said carriage plates are mounted trolley rollers 21 which engage a rail 22 extending between and secured to the side frame pieces 2 and 3, this rail preferably being in the form of an inverted channel bar. The carriage plates in their depending portions have alining square openings, numbering forty-five in each plate and located to form nine vertical series of five each, Fig. 5. In these openings the denominational stop pins 23 are fitted to slide forward and back and each may advance for coöperation with either the shoulder 15$^c$ or the shoulder 15$^d$ of a slide bar 15. Normally of course they are all withdrawn out of the transverse vertical plane of the rearmost shoulders 15$^c$ as well as being removed laterally a step beyond the longitudinal vertical plane of the units slide bar (Fig. 5). The escapement mechanism by which, upon depression and release of an amount key, the carriage is caused to sl one step to bring the first vertical ser stop pins into line with the units sl.ie bar and so on, will be later described, it being understood of course that as usual in this type of machine successive depression of keys or of the same key will step the carriage over an extent corresponding with the denominational value of the amount being handled. Leaving the details of this escapement mechanism for description later on, I shall proceed to explain the control of the carriage stop pins 23 by the keys 5. It will be understood that the keys coöperate with one vertical series of stops at a time and that their manner of coöperation is the same for each series. It will be noted that the ten keys are to coöperate with five stops in such manner as to determine ten different positions of a slide bar 15. It will be obvious that this can be accomplished by causing five of the keys to position the five stops respectively for coöperation with one of the shoulders 15$^c$, and causing the other five keys to position said five stops respectively for coöperation with the other shoulder 15$^d$. This means that the keys coöperate in pairs with the stops, one key of a pair moving a stop to a greater extent than the other key moves it.

Referring now to Fig. 5 it will be noted that five arms 25 are assembled at the rear of the machine and are graduated in length their upper ends being turned laterally to form a vertical series of acting fingers 25$^a$, projecting forward as shown in Figs. 1 and 8 so that they are in close proximity to the rear ends of the stops. The arms 25 constitute vertical branches of members in the nature of bell crank levers pivoted independently of each other upon a frame cross rod 26 and each having a long and a short horizontal rearwardly extending arm from one or another of which springs the integral vertical branch or arm 25. This is best illustrated in Fig. 13 which in a diagrammatic way shows the manner of pairing the keys, Fig. 5 also furnishing a similar diagram. Taking first the bell crank lever which coöperates with the lowermost stop 23 of a vertical series it will be understood that this is actuated by the zero and "5" keys since this particular stop moved into the path of the upper shoulder 15$^d$ on a slide bar limits ascent of the latter to a single step which brings the cipher type 16 to the printing line, whereas moved into line with the lower shoulder 15$^c$ this lowermost stop should measure ascent of the slide bar five steps beyond the zero position so as to present the "5" type at the printing line. The short or "0" arm of this particular bell crank is designated 25—0 and the long or "5" arm is designated 25—5. These two arms are connected by a yoke 25$^b$ (Fig. 5) adjacent the pivot rod 26 on the underside thereof, the vertical arm 25 springing from the shorter horizontal arm 25—0. Taking next the bell crank lever that coöperates with the next higher stop, it will be understood that this should be controlled by the "1" and "6" keys. It comprises a short arm 25—1 and a long arm 25—6, Fig. 13, which are united by a yoke 25$^c$ adjacent the pivot rod 26 on the upper side thereof, Fig. 5. It will hardly be necessary to go on and point out the other short and long arms separately for they are similarly connected in pairs the yokes being nested above and below the pivot shaft 26 as clearly shown in Fig. 5 and indicated by dotted lines in Fig. 8. It will of course be perceived that the purpose of the different lengthened arms of the bell crank lever is to provide for operating the same to different extents by depression of different keys of a pair. Figs. 11 and 12 illustrate the different effects produced, the "2" and the "7" keys being chosen for purposes of this illustration. It will be noted that in Fig. 11 the "2" key is shown depressed and the bell crank lever rocked so as to project the stop into the path of the upper shoulder 15$^d$, whereas in Fig. 12 the same stop has been projected only half way so as to coöperate with the lower shoulder 15$^c$, under depression of the "7" key. The keys are arranged to slide vertically through a panel plate 4$^d$ and the bracket 27 and they have studs engaged in bifurcations at the forward ends of levers 28 which diverge to allow the necessary spacing of the key heads (Fig. 13) and which at their middle portions where they extend parallel with each other are loosely journaled upon a frame crossrod 29. Thence these levers extend rearwardly for coöperation with the bell cranks, and their rear arms are bowed sufficiently to clear the hub portions of the bell cranks with allowance for the necessary vertical movement and with provision for coöperation with the horizontal arms of the stop-setting bell cranks. These rear arms of the key-levers carry laterally projecting studs 28$^a$ and 28$^b$ to act upwardly upon said bell-crank arms, and the several key-lever arms vary somewhat in contour as best illustrated in Fig. 8, since the short arms of the various bell cranks are graded in length and so also are the long arms of said bell cranks, this being regulated by the graded distances of the acting fingers 25$^a$ from the pivot rod 26. It will hardly be necessary to go into a minute description of measurements here, this being a mere matter of regulating points of contact and degrees of movement with due regard to centers of oscillation, to provide for corresponding degrees of movement of the stops. Obviously each stop should move exactly the same distance under actuation of any one of the lower group of keys (0 to 4) and also each stop of a series should move the same distance under actuation of any one of the higher numbered keys (5 to 9). The five levers 28 which are operated upon by the said five lower numbered keys (in the present instance the five middle key levers, Fig. 13) extend adjacent the five short bell crank arms respectively and have their studs 28$^a$ projecting laterally thereunder respectively. The other five levers 28 extend similarly adjacent the five longer horizontal arms of the bell crank levers and have their studs 28$^b$ projecting laterally under these longer arms respectively. It will be obvious therefore that whenever one of the keys of the lower group is depressed the short bell crank arm will be operated upon and the associated stop pin will be projected the greater distance to coöperate with the upper slide bar shoulder 15$^d$. On the other hand depression of any one of the higher group of keys will cause the associated bell crank lever to be rocked by action upon its longer arm and the associated stop pin will be projected the shorter distance for coöperation with the lower shoulder 15$^c$. It will be understood that the "dip" or key depression is uniform, the difference in throw between forward arms of levers 28 on which the back row of keys operate and forward arms of levers 28 on which the front row of keys operate, being compensated for by variations in distance rearward from the pivot rod 29 of the points of contact between the studs 28$^a$ and 28$^b$ and the bell crank arms. Here again it is hardly necessary to go into minutia of measurements it being a matter of shop practice to arrive at the correct articulation. The forward arms of the key levers are normally upheld by springs 30 and the vertical arms 25 of the stop operating bell crank levers are normally held rearward by spring 25$^e$, Fig. 8.

It is desirable to guard against any possible overthrow of the stop pins when projected the shorter distance and to this end a limit bar 31 is arranged in the longitudinal vertical plane of the bell crank fingers 25$^a$, Fig. 15, the rear straight edge of said bar being normally flush with the vertical edges of the slide bars 15 above the upper shoulders 15$^d$, Fig. 11. This limit bar has parallel oblique slots 31$^a$ which embrace fixed guiding studs 31$^b$, the bar being movable rearwardly to such position as illustrated in Fig. 12, wherein its rear edge will be seen to come flush with the vertical edges of the slide bars 15 between the two shoulders 15$^c$ and 15$^d$. When thus positioned it will effectively prevent overthrow of the stop pins into the path of the upper shoulder 15$^d$. The said limit bar is operated through connection with the five key levers of the higher values (5—9) each of said levers having a rearwardly projecting prong 28$^c$ which extend under the cross rod 32 of a bail comprising side arms 32$^a$ secured to a rock shaft 32$^b$, Fig. 13, which also has secured to it an intermediate arm 32$^c$ embracing the rod 32 and projecting forward for engagement with the limit bar 31. The latter has an ear at its lower rear portion carrying a stud in a bifurcation of said arm 32$^c$. A spring 33, Fig. 8, holds the above described bail normally lowered and the limit bar correspondingly forward. It will be obvious that depression of any one of the higher numbered keys will rock the bail upwardly and thereby throw the limit bar rearward through the medium of the arm 32$^c$.

Passing now to the stepping of the stop carriage to the left, the reference numeral 40 (Figs. 1, 5 and 8) designates a coiled spring lying in the channel of the bar 22 and connected at one end to the same and at the opposite end to an end plate 17$^a$ (Fig. 5) of the carriage which plate extends under the channel bar 22 and is formed to extend up into same. The escapement mechanism before mentioned comprises a reciprocating bar 41, Fig. 8, mounted to slide forward and back in suitable guideways of the framework. This bar is notched in its under side to straddle the escapement rack 20 and in rear of the notch has a beveled portion 41$^a$, Figs. 9 and 10, constituting the fixed dog of the escapement. Pivoted to ears on the bar 41 is the loose dog 42 of the escapement, to the upper portion of which is attached a spring 42$^a$ tending to swing the lower end of this dog to the right as the machine is viewed from the front which would be to the left as the parts appear in Fig. 5. Normally the spring 40 is overpowering said spring 42$^a$ so that the loose dog is against the bar 41 under engagement of the face of the end tooth of the ratchet 20 with said dog (Fig. 5), the carriage being thus held in its normal position against the stress of the spring 40. Obviously if the escapement bar 41 is moved forward disengaging the loose dog from said end tooth of the ratchet, said dog will be rocked by the spring to such position as illustrated in Fig. 10, the fixed dog 41$^a$ then taking up a position in front of the ratchet tooth and the carriage and ratchet partaking of the initial part of a shift. Then when the bar 41 is moved back to normal the final part of the shift will take place so that the escapement members are left in such relation as illustrated in Fig. 9. This operation will position the first series of stop pins 23 in the plane of the units slide bar 15.

The connections through which the escapement bar 41 is reciprocated by depression of any one of the keys 5 comprise a lever 44, Fig. 8, pivoted intermediate its ends to the framework, bifurcated at the end of its upper arm to engage a stud on the bar 41; and a bell crank lever 45 having a stud engaging a bifurcation at the end of the lower arm of said lever 44, one arm of said bell crank lever constituting one side of a bail whose cross rod 46 overlies a transverse series of lugs 28$^d$ on the key levers. It will be obvious that depression of any one of the keys will rock the bell crank lever 45 and through it the lever 44 in a direction to thrust the escapement bar 41 forward. The bail is secured to a rock shaft 47 to which is also fastened a depending arm 48 (Fig. 1) having coupled to it a horizontal link 49 whose forward end is coupled to a pendant arm 50, and a spring 51 applied to said arm 50$^b$ operates through the link 49 and arm 48 to return the escapement bar 41 to normal upon release of the amount key (the link 49 and arms 48 and 50 are not, of course, introduced merely to accommodate a spring for restoring the escapement bar; their further function will be later explained).

It will be understood that successive depression of keys or of the same key will effect repetitions of the above described escapement action and that in such case the first key depression is for setting up the highest digit of the amount being handled so that the alining of the first vertical series of stop pins 23 with the unit slide bar 15 is only momentary, said series of stop pins being stepped over from slide bar to slide bar until the complete amount has been set up in the stop carriage when this first series of stop pins will be alined with the order of slide bar appropriate to the highest digit in the amount, other series of stop pins being in alinement respectively with slide bars to the right. Slide bars that may still remain to the left of the first series of stop pins should of course, be restrained in the subsequent operation of the machine, and to this end the front plate 17 of the stop carriage is formed to the left of the portion of the carriage which contains the stops, with a lower extension 17$^e$, Figs. 1, 4, 8 and 11 and the lower part of this extension is turned forward and formed into a transverse series of horizontal fingers 17$^f$, Fig. 4. There is one of these for each slide bar 15 and normally they stand above and in line with the shoulders 15$^c$ respectively as shown in Fig. 15 so that if the machine is operated without depression of amount keys *i. e.*, if there is merely a blank operation, the slide bars will be stopped at their zero positions by the abutment of the shoulders 15$^c$ against said fingers 17$^f$ respectively. The same thing happens with respect to slide bars to the left of the highest order used in setting up an amount, as shown in Fig. 14, the fingers, of course, being stepped over to the left from slide bar to slide bar as the carriage is stepped over in the setting up of the amount.

It is, of course, desirable that the set positions of the stop pins be positively preserved so long as any stop pins are in the field of the slide bars. To this end there is fixed to the frame side piece 3 (Fig. 5) an upright plate 50 extending transversely toward the stop carriage intermediate the front and rear plates thereof and formed into a series of locking tines 50$^a$, one for each horizontal series of stop pins. Each of the latter is formed in its upper side with three equidistant square notches 23$^d$ and the forward notches stand normally in transverse alinement with the said tines as illustrated in Fig. 8. These tines terminate in beveled ends and normally the forward notches of the first vertical series of stop pins are just beyond the ends of the tines. When a stop pin is advanced the short distance for co-action with a slide bar shoulder 15$^c$, the second or middle notch of that stop pin is brought into line with the associated locking tine. When a stop pin is advanced the greater distance for co-action with a slide bar shoulder 15$^d$ its third or rearmost notch is brought into line with the associated locking tine. The first shift to the left of the stop carriage from its normal position engages the tines with notches of the first vertical series of stop pins. Forward notches of unoperated pins engage with the associated locking tines, and the second or third notch of the operated pin engages with the remaining tine according to how the pin has been set. It will be obvious that as the shifting of the carriage continues, similar interlocking of stop pins with tines will occur as illustrated in Fig. 14.

*Restoring setting-up mechanism to normal.*

A stud 17$^g$ projects from the rear plate 17$^a$ of the stop carriage and is equipped with a roller against which a pawl 60, Fig. 5$^a$, is adapted to operate in returning the stop carriage to normal against the stress of the spring 40. The pawl is normally disengaged from the stud by reason of one side of a forked portion 60$^a$ of the pawl being in contact with a roller 2$^a$ in a bearing on the side frame piece 2, as illustrated in Fig. 5. The pawl is pivotally mounted at the upper end of an operating arm 61 which at its lower end is sleeved upon a stud 62 on the frame work Fig. 3. Journaled upon the sleeve is the hub of a bell crank lever 63, the upwardly extending arm of which engages a stud 61$^a$ on the arm 61. A spring 64 applied to said stud connects the arm with the frame side piece 2 and thus holds the arm normally to the right or as the parts are viewed in Fig. 5, to the left, with the pawl disengaged from the stop carriage as before described so that the before described stepping over of the said carriage will not be interfered with. In this connection it may be noted that the upper portion of the pawl is offset rearwardly from the lower portion (Fig. 3) so as to pass the stud 17$^g$. The horizontally extending arm of the bell crank lever 63 is connected by twisted link 65 with one arm of another bell crank lever 66, Fig. 2, to the upwardly extending arm of which is coupled a link 67. This link is notched in the under side to engage over a stud 68 on a full stroke sector 69 fast on the shaft 14$^a$ with which the operating handle 14 is interlocked. It will be obvious that forward pull of the operating handle will rock the bell crank 63 and thereby swing the arm 61 over to the right as the parts are viewed in Fig. 5 carrying the pawl 60 away from the roller 2ª. A spring 60ᵇ connects an ear of the arm 61 with an arm of the pawl and acts to swing the latter so as to put its acting portion in line with the stud 17ᵍ to become engaged therewith as illustrated in Fig. 5ª and on return of the arm 61 force the stop carriage back to the left as the parts are seen in Fig. 5. However, this does not take place as an immediate accompaniment to the backward swing of the operating handle, for it is necessary that the slide bars 15 shall first be restored or so far lowered as to avoid contact between projected stop pins and portions of slide bars below their stop shoulders. The tensioning of the spring 64 stores power for returning the stop carriage after the bell crank lever 63 has rocked back along with the return of the operating handle rearward, and that spring is temporarily restrained as follows: There is fixedly mounted upon the back carriage plate 17ª and spaced therefrom a ratchet rack 70, Fig. 5, and there is journaled in the framework in rear thereof a rock shaft 71 to the right-hand end (Fig. 5) of which is secured a pawl 72, Fig. 2, for engaging said rack under actuation of a spring 73. The latter is connected at one end to a stud 74 on an arm 75 which is fastened to the left-hand end (Fig. 5) of the rock shaft 71. Said spring being fastened at its other end to the framework holds said stud in contact with the upper arm 76 of a lever pivoted intermediate its ends on a frame cross rod, the lower arm 77 of this lever being in engagement with a stud 66ª on the bell crank 66. The spring being inferior to spring 66 is thus normally restrained so that the pawl 72 is elevated above the rack 70 as illustrated in Fig. 2. However, immediately the bell crank 66 is rocked by the forward pull on the operating handle the spring 73 acts to force the said pawl into engagement with the said rack behind a tooth thereof so that though the pawl 60 becomes engaged with the stud 17ᵍ on the stop carriage and the bell crank 63 rocks back with the return of the operating handle rearward, the arm 61 will not accompany it. However, just as the operating handle reaches the end of its rearward movement the stud 66ª strikes the lever arm 77 and disengages the pawl 72 from the rack 70, whereupon the spring 64 snaps the carriage back to normal position.

Of course, any stop pins which were projected for coöperation with slide bars, must be restored to normal so that the machine will be ready for a second operation. Referring to Figs. 8 and 13 to 15, it will be noted that the support for the limit bar 31, which appears as a vertical plate 80 is continued rearward as a cam plate 80ª and thence to the right as a guard plate 80ᵇ suitably supported by a frame bracket 2ᶜ. As the stop carriage is returned to the right any projected stop pin will strike the cam plate 80ª and be thrust rearward thereby as will be obvious from the illustration in Fig. 14, and the series of stop pins will successively take up positions in rear of the guard plate 80ᵇ. The return movement of the stop carriage is in excess of that required to put it in normal position, this being for the purpose of restoring a projected stop of the first vertical series and then having said series left free (by reason of slight reaction of the carriage) for the projection of any member thereof, Fig. 15. It will be understood that as the carriage returns the teeth of the ratchet rack 20 click past the loose escapement dog 42. In the excess movement of the carriage the last tooth of said rack is carried beyond the dog and then as the pawl 60 is disengaged from the carriage stud 17ᵍ, the carriage advances against said dog and stops when the latter comes up against the bar 41, see Fig. 5.

*Correction or error equipment.*

It is desirable in these machines to provide for restoration of the parts of the setting up mechanism to normal at will in cases where an error has been made in the touching of the keys. In machines of the type under consideration here, this is accomplished by returning the stop carriage to normal. In the present instance this is done through the medium of an arm 90, Fig. 5, which extends in the line of travel of the carriage stud 17ᵍ, said arm being secured to a rock shaft 91 journaled at the rear in the bearing 62 (Fig. 3) and extending forward to a point below the error key 6 where said shaft journals in a bearing on the frame bracket 27. A link 92 connects the error key with an arm 93 fastened to said rock shaft. The error key is normally upheld by spring 94 so that the carriage restoring arm 90 extends normally to the left or as the parts are seen in Fig. 5 to the right. It will be obvious that upon depression of the error key the shaft 91 will be rocked and the arm 93 thereby swung over so as to act upon the carriage stud 17ᵍ and restore the carriage to normal.

*Back spacing of stop pin carriage.*

The equipment just described provides for throwing the stop carriage all the way back to its normal position. It is of advantage also to be able to step the carriage backwardly in case it has simply been moved over too far and the mere movement of it a step or more backwardly will correct this sort of error and avoid the necessity of setting up an amount all over again. To provide for this the machine is equipped as follows: A special key designated 900 and inscribed "Back space" is located in rear of the amount keys on a stem 901 which projects through a slot in the casing 4, Figs. 34, 35 and 37. The slot is widened as illustrated in Fig. 37 to permit of the introduction of a screw driver to detach the key stem from a lever 902 when the casing is to be removed. Said stem is fastened by a screw to the forward end of said lever so that it works as one therewith. This lever is pivoted at 903 intermediate its length and extends to the rear part of the machine adjacent the stop carriage. Here it is formed with a laterally projecting cam finger 904, Fig. 38. Arranged to coöperate with this cam finger is a roller 905 mounted upon one end of a slide bar 906. The latter engages a guiding slot in an intermediate frame piece $4^b$ and is slotted near its opposite end to embrace a stud 907. A spring 908 draws the said bar in a direction to cause its roller 905 to depress the rear end of the lever 902 so that normally the key 900 is kept elevated, said roller being at the base of the cam finger 904. A pawl 910 is pivoted to the bar 906 and a spring 911 tends to lower said pawl. Normally, however, a curved finger $910^a$ of the pawl rides upon an extension of the stud 907 so that the spring 911 is restrained. A lower curved finger $910^b$ of the pawl stands ready to engage the rack 20 but the normally elevated position of the pawl, enforced by engagement of the finger $910^a$ with said stud 907, positions this lower finger $910^b$ above the plane of the rack as shown in Fig. 38. However, when the key 900 is depressed the cam finger 904 is caused to act upon the roller 905 and forces the bar 906 to the left as the parts are seen in Fig. 38, so that the end of the finger $910^a$ rides down off the stud 907 and the finger $910^b$ is lowered into engagement with a tooth of the rack 20 and continued movement of the bar causes the pawl to act upon the rack and move it one step backward, the pawl being slotted between its two fingers a sufficient extent to provide for the necessary movement.

It will be obvious that through the above described equipment the stop carriage can be moved backward one or more steps by depression of the key 900 so as to correct any overstepping in the setting up of the amount.

Repeat equipment.

It is obvious that to repeat operations with the same number or amounts set up, and without renewed manipulation of amount keys, it is only necessary to prevent the restoration of the stop carriage as a result of operating the handle of the machine. As before pointed out the link 67 is notched for engagement with the sector 69 (Fig. 21). A spring $67^a$ normally enforces the engagement but depression of the repeat key 7 lifts the forward end of the link against the stress of said spring and effects a disconnection of the link from the sector so that the stop carriage will remain as positioned by the depression of amount keys. This is accomplished through the medium of a lever 95 whose forward end is slotted to embrace the stud $7^a$ on the repeat key stem, Fig. 2. This lever is pivoted intermediate its ends and its rear arm $95^a$ extends under a stud $67^b$ at the forward end of the link 67. The repeat key stem as usual has a notch $7^b$ to engage the panel plate $4^d$ for locking down this key as long as may be desired.

Operations counter.

The repeat equipment is very commonly utilized for the performance of multiplication. In this connection it is desirable to provide a counter which will show the number of times the machine has been operated so that the user will not be required to rely wholly upon mentally keeping count of the operations required by a multiplier digit. In the present machine a counter wheel 600 is located to show through the panel openings $4^a$, Fig. 34. This wheel is located behind a shield 601 which has a right angle portion 602, Fig. 28, supplying a bearing for one end of a shaft 603 to which the wheel is secured. The other end of the shaft finds a bearing in the side frame piece 2 and said shaft has secured upon it near this other end a pair of ratchet wheels 604 and 605 the former being a driving wheel and the latter a back stop wheel. A pawl 606 is arranged to operate upon the ratchet wheel 604 said pawl being pivoted to the upper end of a vertical bar 607 normally held away from said wheel by the contact of a branch 608 with a frame stud 609, Fig. 26. A spring 610 applied to another branch of the pawl connects with an ear of the bar 607 and tends to throw the pawl into engagement with the ratchet wheel. The bar is normally upheld by a spring 611 and has at its lower end a hook 612 adapted to be engaged by a stud 613 on the full stroke sector 69. Normally the hook is out of the path of this stud so that the counter is not affected in operations of the machine, the purpose being to have it come into play only when the repeat key is depressed. The lever 95 which is coupled to the repeat key has a pendent arm $95^c$ which is coupled to a link 615, and the bar 607 has a forwardly extending arm $607^a$ with a depending front portion which is coupled to said link. Thus when the repeat key is depressed the bar 607 is swung rearwardly to bring its hook 612 into the path of the stud 613. Then each time the machine is operated the bar 607 is pulled down and the pawl 606 caused to turn the ratchet 604 one step and display numerals progressively through a sight opening in the shield 601 until the numeral 9 shows therethrough. Then the pawl rides upon a plain portion 604ª of the ratchet wheel and ceases to turn the latter. It will be understood of course that multiplication is done by taking one digit of the multiplier at a time and so there is no occasion for counting beyond nine. The ratchet and the counter wheel are turned against stress of a spring 620 wound around the shaft 603 and connected at one end to the ratchet wheel and at the other to a frame stud. A detaining pawl 621 is employed to engage the other ratchet wheel 605 so as to hold the counter wheel at the positions to which it is turned by the actuating pawl 606. The pawl 621 is pivoted to a frame stud and has a short angular arm 621ª coupled to a vertical bar 622 which is upheld by a spring 623 and at its lower end embraces the cross rod 624 of a bail located at the bottom of the machine, see Figs. 26 and 28. This bail comprises side arms 625 secured to a rock shaft 626, and the cross rod 624 is extended under the cipher key lever specially designated 28°.

It will be understood that where the multiplier runs to tens or beyond it is necessary after repeating operations to the number of one digit thereof to set the stop carriage over, this being done by depression of the cipher key. As the count should begin again for the next digit of multiplier, it is necessary to re-set the counting wheel. It will be seen that the above described connections provide for this. The said cipher key lever has a lug 627 Fig. 26, which bears upon the bail cross rod 624 and when the cipher key is depressed to set over the stop carriage, said bail will be depressed and will pull down the bar 622 thereby disengaging the pawl 621 from the ratchet 605 whereupon the spring 620 turns the counter wheel back to zero. The backward turning is limited by abutment of a stud 630 on the side of the counter wheel (Figs. 27 and 29) against the straight side of the reduced portion of a stud 631 set in the portion 602 of the shield plate 601. When the wheel has been turned so that it exhibits "9" through the sight opening in said plate the stud 630 encounters the other side of said stud 631, see Fig. 31.

It is also desirable to have the counter wheel resettable at will along with the resetting of the stop carriage as brought about through operations of the error or correction key. Therefore connections are provided between said key and the detaining pawl 621 as follows: The rock shaft 91 which is turned by said key has an arm 635 secured to it, Figs. 26, 28 and 33, which arm has a stud 636 overlying a bail cross rod 634. Upon depression of the error key the said arm 635 is swung down and depresses said bail with the same effect in the matter of re-setting the counter wheel as when said bail is depressed by the cipher key.

Denominational indicator.

For the guidance of the operator in using a machine of this type it is desirable to provide an indicator which will show as operations proceed to what point the stop carriage has been stepped over. For this purpose in the present instance an indicator plate 700 is fastened to an upper inclined portion of the guard plate 601 and marked off to denote denominational or decimal places, and an index arm 701 has a pointer to travel along this scale of indicating marks as the carriage shifts. Said arm is pivoted to a stud on the rear side of the shield plate 601 and has formed integral with it a gear segment 702 which is in mesh with a similar segment 703 secured to a rock shaft 704. The latter is journaled at its front end in a bearing on the shield plate 601 and at its rear end, Fig. 2, in a bearing on a frame bracket 706, Fig. 28, at a point adjacent the vertical plane of the front plate of the stop carriage. A depending arm 707 is secured to the rear end of said rock shaft and is jointed to a link or pitman 708 pivotally attached to the said plate of the stop carriage. It is obvious that through these connections the index hand 701 will be moved step by step as the carriage moves and of course the parts are so proportioned and related as to cause the pointer to move from one mark of the scale to the next as the carriage shifts from one numerical order to the next.

Accumulating mechanism.

The racks 15ᵇ of the slide bars 15 mesh respectively with gear segments 100 formed on the rear ends of levers 101, Fig. 1, which journal independently of each other on a rock shaft 102, said levers being forked forward of said shaft so that each comprises two arms 103 and 104. Gear sectors 105 are pivoted to said levers respectively forward of the shaft 102 to provide for limited movement independently of the levers for transferring or carrying purposes. As the construction is the same for each numerical order a description of one set of carrying devices will suffice. The lower arm 104 of the lever has a lip 104ª extending under the rack sector for the purpose of moving the same along with it in the ordinary adding operations and the sector has a downward extension 105ª with a lug 105ᵇ to contact with said lip for limiting the carrying movement of the sector. A spring 106 connects the sector with the upper arm 103 of the lever, said spring tending to impart the carrying movement to the sector. The spring is normally restrained by reason of abutment of the forwardly turned lower end of the sector extension 105ᵃ against a laterally turned end portion of a transfer pawl 107 which is pivoted intermediate its ends upon a cross rod 108. The upper end of this pawl is alined with a cam disk 109 secured to the wheel 12 of next lower order. The pawl is connected by a spring 110 with a latch 112 which has two stepped shoulders 112ᵃ and 112ᵇ for engagement with a forward extension 107ᵇ of the pawl. Normally said extension engages the lower shoulder 112ᵃ as shown in Fig. 1. The upper end of the pawl has the usual form, being inclined on one side for coöperation with the cam edge of the disk 109, and straight on the other side for contact with the radial edge of said disk in totaling and sub-totaling operations. When in rotation for adding the cam disk trips the pawl, disengaging it from the rack extension, the latch 112 shifts to engage its upper shoulder 112ᵇ under the pawl extension 107ᵇ so as to hold the pawl displaced to the end of the operation and permit the extra one step movement of the rack for carrying purposes.

The levers 101 are held in normal position by the engagement with their arms 104 of the cross bar 114 of a restoring frame comprising side pieces 114ᵃ secured to the rock shaft 102. It will be understood that when the operating handle is pulled forward this frame rocks down permitting the levers to move and the racks to be set according to the previous setting of stop pins 23, and that when the handle returns said frame is raised carrying the levers and racks back to normal and that if transfer pawls are tripped racks associated with higher order wheels will advance one step beyond normal.

The wheels 12 have associated with them pinions 115, one pinion being fixed to each wheel and adapted to mesh with the associated rack. The pinions and wheels are mounted in a rocking frame comprising side pieces 116, intermediate plates 117, (Fig. 7) and connecting cross rods 118 and 119, secured to a rock shaft 124. The rod 119 extends in rear of upper portions of the latches 112 so that when the frame rocks to disengage the pinions from the racks such of the latches as have shifted to detain the pawls 107 displaced, will be returned to normal releasing said pawls. It will be understood that the pinions normally engage the racks and in an adding operation are disengaged therefrom at the outset and remain disengaged during the descent of the rack sectors and then reëngage the latter prior to their ascent. The wheels are locked against turning when disengaged from the racks, by pawls 120 pivoted at their lower ends on a frame cross rod and urged toward the wheels by springs 121. These pawls have openings through which a frame cross-rod 132 extends as shown in Fig. 1, slight play being allowed so that the wheels will retract the pawls and locking of the wheels until reëngaged with the racks will be insured.

Referring next to the control of the rocking frame for adding purposes, the rock shaft 124 has secured to its right-hand end an arm 125 (Fig. 2) slotted at its rear to embrace a stud 126 (Fig. 16) carried by an arm 127 loosely mounted upon the rock shaft 124. Normally the stud is at the upper end of the slot as illustrated in Fig. 2, a spring 128 (Fig. 16) operating to hold the accumulator frame rearward and said arm 125 downward. A spring 130 applied to the arm 127 tends to swing the latter downward but such movement is normally prevented. Thus a roller 131 on the end of the arm 127 is in engagement with an inclined flange 132 at the forward end of a segment 133 which is part of an arm 134 operatively connected to the driving shaft 14ᵃ. Furthermore a downwardly projecting finger 127ᵃ on the arm 127 is normally engaged with the shoulder of a latch 135 pivoted to the frame work and drawn upward by a spring 136. The segment 133 carries on its inner side a cam strip 136ᵃ inclined at both ends as indicated by dotted lines in Figs. 2 and 16 and shown partly in full lines in Fig. 18. Normally the front end of this cam strip is a short distance in rear of the roller 131. In an adding operation when the sector 133 swings forward relieving the roller 126, the arm 127 is still restrained by the latch 135 and the roller is kept in line with the inclined front end of the cam strip 136ᵃ so that very shortly after the operation starts said cam strip acting upon the roller forces the arm 127 upwardly and, through engagement of its stud 126 with the upper end of the slot in the arm 125, rocks the accumulator frame, disengaging the pinions from the rack sectors. As the segment 133 nears the end of its forward swing the inclined rear end the cam strip 136ᵃ passes under the roller 131 so that the spring 128 is then able to return the pinions to engagement with the sectors, the latter having come to rest. The cam strip passes on beyond the roller and a rear inclined flange 132ᵃ of the segment 133 comes in contact with said roller and elevates the arm 127 into line with the rear face of the strip 136ᵃ, the arm 127 having meantime been unlatched, as will presently be described, and so having momentarily swung down beyond the position illustrated in Fig. 16.

Explaining next the unlatching of the arm 127, a tappet piece 140 (Fig. 2) normally stands horizontally in line with a finger 135ª of the latch 135 a short distance from the latter. This tappet is pivotally connected to a depending arm 141 of a bell crank hung on the shaft 142 (Fig. 18) and having a rearwardly extending arm 143 which stands in the path of a roller 144 on the arm 134. As the latter arm reaches the end of its forward swing said roller 144 strikes the arm 143 and thrusts the tappet forward displacing the latch 135 so as to disengage it from the finger 127ª of the arm 127 and permit the latter to drop so that its roller 131 passes the rear end of the cam strip 136ª though in the case of an adding operation the arm is instantly elevated into line with said cam strip by the action of the cam flange 132ª as already mentioned. The result is that as the arm 134 starts back the roller 131 is permitted to run down the inclined flange 132ª to a point below the cam strip 136, the arm 127 shifting under actuation of its spring 130 so that its stud 126 moves to the lower end of the slot in the arm 125. As the arm 134 and segment 133 move rearward the cam strip 136 passes over the roller 131 thus the pinions remain in mesh with the racks as the latter ascend. As the segment 133 nears the end of its rearward movement its forward cam flange 132 acts upon the roller 131 and forces the arm 127 upward to the normal position illustrated in Figs. 2 and 16. The roller 144 having meantime left contact with the arm 143, the spring 140ª will have retracted the thrust piece or tappet 140 and the spring 136 will have drawn the latch 135 into engagement with the finger 127ª of the arm 127 so that the latter will be re-latched in its normal position.

To guard against any possible derangement by reason of the pinions being normally engaged with the racks under spring pressure only, a link 150 (Fig. 16) is coupled at its forward end to the accumulator frame and arranged to slide at its rear end on the rock shaft 102, and a roller 151 is mounted upon the arm 134 to engage a lug 153 on said link 150 when the parts are at normal in order to insure the position of the pinions.

*Eliminating or non-adding.*

It has before been mentioned that the machine is equipped with a "non-add" key designated 10 (Fig. 34). The purpose of this key is to prevent the addition of a number which has been set up by depression of amount keys and of course to accomplish this result the pinions should be kept out of engagement with the racks during the return movement of the handle, as well as during the forward pull thereof. It will be clear that if the tappet piece 140 is disabled the roller 131 will remain in the path of the cam strip 136ª so that in return movement of the handle the pinions will be moved out of mesh with the racks and so will not be turned. Said tappet piece is longitudinally slotted to receive a stud 160 (Fig. 16) carried by an arm 161 which is loosely mounted upon the shaft 142. The "non-add" key 10 surmounts a long irregular-shaped stem 162 (Figs. 2 and 3) whose lower end overlies the stud 160 so that upon depression of the key the arm 161 will be swung down and the tappet moved out of line with the finger 135ª of the latch 135 to such position as illustrated in Fig. 18. Therefore the arm 127 is not unlatched as in the case of adding but will be restrained by the latch 135 and so the roller 131 will remain in line with the cam strip 136 and on the back stroke the pinions will be thrown out of engagement with the rack sectors.

*Taking a sub-total.*

It will be understood that as usual a sub-totaling operation involves reverse rotation of number wheels to zero position in the forward pull of the operating handle, and return of those wheels to again register the total as the handle returns. The sub-total key 9 is shown in action in Fig. 20. Its stem has a stud 170 which engages the bifurcated forward end of an arm 171 upheld by a spring 172 and loosely journaled upon the shaft 142. This arm is unified with a yoke 173 (Fig. 23) which has a finger 174 projected over a stud 175 on an ear of the latch 135. When the sub-total key is depressed the said latch will therefore be displaced, releasing the arm 127. Consequently when the arm 134 advances the roller 131 runs down the cam flange 132 to the under side of the cam strip 136 and the latter has no effect upon the arm or the accumulator frame except that it serves to insure the continued engagement of the pinions with the racks since the stud 126 has moved to the lower end of the slot in the arm 125. At the end of the forward swing of the arm 134 the cam flange 132ª will act upon the roller 128 and force the arm 127 up as before described, but the arm does not remain up as it continues to be unlatched. Therefore in the return movement of the arm 134 the cam strip 136 will again pass over the roller 131, the pinions remaining in mesh with the racks.

*Taking a grand total.*

This, of course, differs from taking a sub-total in that the accumulator wheels are left at zero. While, therefore, the keeping of the wheels in mesh with the rack sectors during the forward stroke of the operating handle is practised in much the same way as in taking the sub-total, it is necessary to modify the control so that the wheels will be disengaged before the ascent of the racks. The total key 8 is upheld by a spring 180 (Fig. 16) and carries a stud 181 overlying an arm 182 fastened to the shaft 142. There is also secured to that shaft a hub 183 (Fig. 19) having an arm 184 connected by a spring 185 to a stud on an arm 186 standing in the path of the roller 144 of the operating arm 134 and loosely journaled on a reduced portion of said hub (Fig. 19). Another shorter arm 187 integral with the arm 186 normally engages a stud 188 on the arm 184 to which stud the spring 185 is attached. Still another arm 189 integral with the arm 186 projects forward over the stud 175 of the latch 135. A forward extension 190 of the arm 184 overlies the stud 160.

The result is that upon depression of the total key the shaft 142 is rocked and so are the various arms above specified so that the latch 135 is displaced, and also the tappet-piece 140 (Fig. 16). The latch is displaced through the medium of the spring 185 which is superior to the spring 136. At the conclusion of the forward swing of the operating arm 134 its stud 144 strikes the arm 186 and thereby releases the latch 135 so that it can return and engage the arm 127, thus keeping the roller 131 of the latter in line with the cam strip 136ª with the result that upon the return of the operating arm 134 the accumulating pinions will be rocked out of engagement with the rack sectors and will be left at zero. It will be understood that at the end of the forward swing of said arm 134 the cam flange 132ª elevated the arm 127 so that the relatching of the latter could take place.

*Displacing zero stops in totaling and sub-totaling and locking down total and sub-total keys.*

It has been before explained that with the stop carriage at normal the fingers 17ᶠ thereof are positioned over the slide bar shoulder 17ᵉ as illustrated in Fig. 15 and of course it will be understood that in taking a total or sub-total the stop carriage is not shifted as when performing adding operations. However, it is necessary to shift the stop carriage a half step in order to move the fingers 17ᶠ out of alinement with said slide bar shoulders as illustrated in Fig 25. This is accomplished through connection with the rock shaft 142 which, as before explained, is rocked upon depression of the total key. It is also rocked upon depression of the sub-total key by reason of engagement between a stud 170ª (Figs. 1, 20, 22 and 23), projecting from the stem of the sub-total key, and the arm or lever 182. The rock shaft 142 has secured to its right hand end a bell-crank lever 190 whose upwardly extending arm is connected by a long irregular-shaped link 191 to a rock plate 192 loosely mounted upon the rock shaft 71 (Figs. 22 and 23). This rock plate has a down-turned and laterally extending curved portion 192ª which is notched, as shown in Fig. 24, to embrace a stud 17ʰ upon the stop carriage. Normally the rock plate 192 is raised so that its notch is above said stud and the latter is below an inclined interior edge 192ᵇ of the notch (Fig. 24). When either the total or sub-total key is depressed the rocking of the plate 192 through the connections described causes said inclined notched side 192ᵇ to act with a camming effect upon the stud 17ʰ and move the carriage to the right (which will be to the left as the parts are viewed in Fig. 24) a half step, thereby shifting the fingers 17ᶠ to position out of line with the slide bar shoulders, Fig. 25. Therefore so long as either the sub-total or total key is depressed the slide bars will be free to move distances corresponding with backward rotation of the number wheels.

Through the same connections that disable the zero stop fingers, together with other devices presently to be described, the total and sub-total keys are locked down during an operation of the machine or locked out during an operation which does not call them into play. Thus the rearwardly extending arm of the bell-crank lever 190ª has a stud 195 (Fig. 22) and the full stroke sector 69 (Figs. 2 and 22) has a rib 196 which, with the total and sub-total keys at normal, passes over said stud (Fig. 2) as the full stroke sector is rocked, and with total or sub-total key depressed passes under said stud (Fig. 22). This obviously results in locking of the arm or lever 182.

Now to lock down total or sub-total keys, means are provided for interlocking them with said arm or lever 182. Referring to Figs. 1 and 22 it will be seen that there is slidingly mounted upon said arm or lever 182 through slot and pin connections a plate 200 which has two noses 201 and 202, the former for coöperation with the stud 181 of the total key and the other nose for coöperation with the stud 170ª of the sub-total key. Said plate 200 has an upward and rearward extension 200ª with a cam slot 200ᵇ embracing a frame cross rod 205. Normally the parts are positioned as illustrated in Fig. 1 where the arm or lever 182 is shown elevated and a short portion of the cam slot 200ᵇ, substantially concentric with the arm 182, is engaged with the cross rod 205, with noses 201 and 202 standing in rear of the studs 181 and 170ª. Upon depression of either the total or sub-total key and consequent downward swinging of the arm or lever 182 the plate 200 is of course lowered, and by reason of the engagement between the cross rod 205 and oblique portion of the slot 200ᵇ, said plate is thrust forward, being also carried toward the key studs by the arc movement of the arm or lever 182. The result is that if the total key is the one being depressed the nose 201 moves over the stud 181, as illustrated in Fig. 22, so that the total key becomes interlocked with the arm or lever 182, and since the latter is locked down by the sector rib 196, the total key is locked down during the operation. Correspondingly if the sub-total key is the one depressed, the nose 202 will move over its stud 170ᵃ and the sub-total key will thereby be locked down during the operation.

A spring 199 applied to the link 191 holds the same and parts connected therewith in normal position and returns them to normal position when the total or sub-total key is released at the end of an operation.

*Compelling re-setting of carrying mechanism before taking a total or sub-total.*

With carrying mechanism of the kind hereinbefore described wherein racks remain displaced at the conclusion of an operation involving carrying, it is essential that such racks be restored to normal position before a total or sub-total is taken since otherwise the total or sub-total would not be correctly set up for printing, it being understood that the lost motion between the rack sectors and their supporting levers corresponds with one-step movements of type carriers which, in orders or denominational places where no digits occur, position ciphers at the printing line. It follows that if a totaling or sub-totaling operation was gone through with when one or more racks had been moved beyond normal to effect carrying, type carriers corresponding with such racks would, through the backward turning of number wheels to zero, move one step short of the positions they should occupy. Therefore it is customary in machines employing this character of transfer mechanism to prevent a totaling or sub-totaling operation following adding operations, until a blank operation is had for re-setting any racks that may have moved beyond normal in carrying. Provisions are made to this end in the present machine. Referring to Fig. 1 a locking bar 210 extends adjacent the lower ends of the total and sub-total keys 8 and 9 and is formed with lateral flanges 210ᵃ and 210ᵇ spaced apart and designed to move under said keys respectively as the result of depression of an amount key and to remain thereunder until a blank operation of the machine has been had. The said bar 210 is drawn forward by a spring 211 and suitably guided at its forward end by the engagement of a bifurcated portion 210ᶜ of the bar with a stud 212 of a frame bracket 213. Normally of course the bar is held rearward in opposition to said spring 211. The rear end of the bar is pivotally connected to a depending arm 214 of a four-armed rocking structure pivoted on a frame stud 3ᶠ and having a forwardly extending arm 214ᵃ normally engaged by a latch 215 hung from the same frame stud 3ᵍ which supports the before mentioned pendent arm 50ᵇ. A spring 215ᵃ connects said latch with a stud on said arm normally holding the latch against said stud and over said arm 214ᵃ. It will be remembered that said pendent arm 50ᵇ was before described as connected by a link 49 with another pendent arm 48 fastened to the rock shaft of the escapement bail which the amount keys operate. When an amount key is depressed and the arm 50ᵇ swung forward the latch 215 is disengaged from the arm 214ᵃ whereupon the rocking structure of which that arm forms a part is released and the spring 211 pulls the bar 210 forward placing the locking flanges 210ᵃ and 210ᵇ under the total and sub-total keys respectively. Another arm 214ᵇ of the aforesaid rocking structure has a widened lower end portion with a concentric slot therein to receive a stud 216 of a thrust bar 217 which is connected by a spring 218 to said slotted arm of the rocking structure, said spring being attached at one end to the forward end of the widened portion of said arm and at the other end to the rear extended end of the thrust bar. The upper end of the latter is in the form of a curved fork 217ᵃ which embraces a stud 114ᵇ on the side piece 114ᵃ of the restoring bail or frame. When the rocking structure is released as before described and swings under the impulse of the spring 211 the said thrust bar will be moved with it through the agency of the aforesaid spring 218 so that the stud 216 remains in the upper or forward end of the slot of the arm 214ᵇ. The arm 214ᵃ has of course moved up behind the latch 215 so that when the arm 50ᵇ is swung back to normal by the spring 51 upon release of the amount key, the rocking structure does not become re-latched but the spring 215ᵃ simply yields and the latch remains against the end of said arm of the rocking structure. Now, in an operation of the machine under the conditions just described the stud 114ᵈ will act against the bottom of the curved slot in the upper end of the thrust bar 217 and force the latter down but if this operation is part of an adding operation it will not effect a restoration of the aforesaid rocking structure to normal. The latter has a rearwardly extending arm 214ᶜ which extends across that portion of the downward and lateral extension 17ᵉ of the carriage plate 17 which has the zero stop fingers 17ᶠ so near thereto that a single shift of the carriage will move the end stop finger over said arm, it being understood of course that such movement of the carriage results from depression of a key and that this has also resulted in release of the rocking structure and movement of the arm 214$^c$ to the dotted line position illustrated in Fig. 1 where it is below the plane of the stop fingers. Further shifting of the stop carriage brings others of the stop fingers over said arm so that whatever amount may have been set up a stop finger will be standing over the arm to prevent movement of the rocking structure back to normal through the action of the restoring frame 114—114$^a$ upon the thrust bar 217. What does take place in this regard is a slight movement of the rocking structure until its arm 214$^c$ abuts the stop finger 17$^f$ and then a stretching of the spring 218. The aforesaid movement is not enough to cause the arm 214$^a$ to be carried below the latch 215, so that upon the upward swinging of the restoring frame the parts go back to their former position, the total and sub-total key remaining fully locked against depression.

Now, if the handle is pulled without depression of any amount keys, then the stop carriage is not shifted and consequently no stop finger 17$^f$ is moved over the arm 214$^c$ and so when the stud 114$^b$ of the restoring frame acts upon the thrust bar 217 the latter's stud 216 will not simply move through the slot of the arm 214$^b$ as before, but through the medium of the spring 218 will swing the rocking structure back to its normal position and withdraw the locking bar 210 thereby releasing the total and sub-total keys. In this operation the arm 214$^a$ wipes down past the latch 215 and the latter re-engages over said arm. In this restoring operation the spring 218 overpowers the spring 211 so that the latter is again tensioned for shifting the bar 210 forward in a subsequent adding operation of the machine.

*Amount printing mechanism.*

The types 16 before mentioned are driven against the roller platen 13, Fig. 1, by hammers 300 independently pivoted upon a frame rod 301 and actuated by springs 302 which connect them with another frame rod 303. These hammers are normally retracted by the engagement therewith of a cross rod 304 of a restoring bail comprising side arms 305 the left-hand one of which has a downward extension 307 in the form of a curved fork embracing a roller 308 upon a rearwardly extending branch 114$^c$ of the left-hand side piece of the rack restoring frame. In every operation the hammer retracting bail is vibrated backward and forward through the camming action of the roller 308 against the sides of the slot in the fork 307. Movement of the hammers does not accompany movement of the retracting frame, however, as a percussive action is desired through the agency of the springs 302 and of course the type must be positioned before the hammers act and the latter furthermore must be under control of the type carriers so that hammers belonging to orders higher than that in which the highest digit of an amount occurs do not act. Normally the cross bar 310 of a yoke comprising side arms 311, engages in notches 300$^a$ of the hammer heads, said cross bar of the yoke being beveled on the upper side and the hammer heads rounded below the straight shoulders of these notches to provide for re-latching at the conclusion of an operation. Said yoke has a depending arm 311$^a$ connected by a spring 311$^b$ with the frame cross rod 303 to enforce the relatching. A bail cross rod 316 is adapted to displace the yoke by acting against the side arms thereof and one of the side arms 316$^a$ of this bail has a depending finger 312 which is connected by a spring 313 to the frame cross rod 301 and said finger stands in the path of a roller 314 on a branch 114$^d$ of the left side piece of the rack restoring frame. Just as the latter reaches the end of its initial swing the roller strikes the finger and rocks the bail sufficiently to release the hammers and in any orders where the latter should act they are fired by their springs 302 and drive the positioned types against the platen. For each hammer there is a restraining hook 315 loosely mounted upon the same shaft 317 which provides a journal bearing for the latching bail. These hooks are adapted to engage notches in the upper sides of the hammer heads but are normally held forward out of line therewith by the cross rod 316 of the aforesaid unlatching bail. This is against the stress of springs 318 connecting the hooks respectively with another cross rod 319 of the latter bail carried by forwardly extending branches 320 of its side members. The hooks have rearward extensions 315$^a$ with downturned extremities adjacent the line of travel of the rear edges of curved fingers 100$^a$ rising from the rack levers 101. The ends of these curved fingers are normally spaced from the downturned extremities of the arms 315$^a$ a distance corresponding with the movement of the said levers and the slide bars 15 to bring zero type to the printing line. Movement beyond that sufficient for such purpose carries the finger 100$^a$ under the associated arm 315$^a$. Consequently when the bail rod 316 is swung rearward such of the hooks as are associated with type carriers that have moved beyond the zero position will be blocked and prevented from engaging their hammers. In other orders, however, where the type carriers have not moved beyond the zero position the fingers 100ª will not have taken up positions under the arms 315, consequently when said bail rod 316 swings rearwardly these hooks will accompany it under actuation of their springs 318 and their catches 315ᶜ will be brought above the notches in the upper sides of the hammer heads. It will be understood that there is lost motion between the bail rod 316 and the yoke 310—311 so that such hooks are first positioned and then the yoke is acted upon. Hammers released by the yoke and over which the hooks have been positioned will be caught by the latter and restrained. However, in the case of ciphers to be filled in to the right beyond digits in an amount, the hammers should not be restrained by the hooks 315. To this end the arms 315ª beginning with that of the highest order have laterally turned tails 315ᵈ, Fig. 4, which underlie adjacent arms to the right respectively, therefore any arm 315ª which is blocked by the associated finger 100ª will in turn block arms to the right and prevent engagement of hooks 315 with hammers so that hammers may fire to print zeroes where they should appear.

Recoil of the type bars 16 after their projection by the hammers is effected through the following described means, see Fig. 1ª: The said bars have a limited sliding movement through guiding openings in the housing 15ª being limited by abutment of shoulders formed upon them against the exterior of said housing. These bars are formed with laterally projecting lugs 16ª which are normally alined vertically in engagement with a retracting bar 16ᵇ. The latter is pivotally connected at its upper and lower extremities to upwardly projecting arms of a pair of bell cranks 16ᶜ and 16ᵈ respectively. Rearwardly projecting arms of said bell cranks are united by a link 16ᵉ and the lower bell crank has a forwardly projecting arm 16ᶠ which is connected by a spring 16ᵍ to the lower portion of the rack bar, Fig. 1. It will be seen that the above described construction is of parallelogram order calculated to secure a uniform action of the spring 16ᵍ against the type bars for holding them normally retracted. The striking of the hammer against any one of the type bars projects the same against the platen in opposition to said spring, it being understood that the hammer does not follow the type bar all the way, so that the desired percussive action is had.

To assist in keeping the bar 16ᵇ alined with the lugs of the type bars, and also to accommodate the structure to the limited space within the housing 15ª, said bar 16ᵇ is widened near its upper end and formed with an arc-shaped slot 16ʰ to embrace the pivot stud of the upper bell crank 16ᶜ which stud is headed over the bar 16ᵇ as illustrated in Fig. 1ª.

Adding without printing.

It is sometimes desirable to add without making any record as for example when doing multiplication by repeated addition, and to this end the aforesaid "non-print" key 11 is provided. The stem of this key as shown in Fig. 2 extends a distance downward within the casing and is slotted to embrace a frame cross rod 320 for guiding purposes, Referring to Figs. 3 and 4 this key stem has a stud 321 which engages the bifurcated forward end of an arm 322 the latter pivoted upon a frame cross rod 323 and forming part of a yoke having another arm 324 which is bifurcated at its upper end to embrace a stud 325 in an arm 326 which depends as part of another yoke comprising side arms 327 and a top cross piece 328 extending over the hammer heads. Normally with the non-print key raised the last mentioned yoke stands forward with its cross bar 328 out of line with the acting end portions of the hammer heads as illustrated by full lines in Fig. 3. However, when the non-print key is depressed this yoke is swung back to put its said cross bar above said acting ends of the hammer heads as illustrated by dotted lines in Fig. 3. Consequently the hammers are prevented from acting.

Combined control of non-add and non-print keys.

As it is desirable to not use both of these keys at once, detenting means common to them is employed so that the depression of one key will release the other. Thus a yoke 400 is hung from a frame cross rod 401, Figs. 2, 3, and 4, and its depending arms 402 and 403 coöperate respectively with the two keys in question. Each of these depending arms has a beveled catch projection 404 to coact with a similar projection 405 on the key. A spring 406 holds the yoke forward to enforce engagement between it and the keys. Such spring connects the yoke with an ear of a link 407 which is bifurcated at its forward end to slide upon the cross rod 320 as a guide and at its rear end is coupled to an arm 408 hung on the shaft 323 and extending downward in the form of a finger for engagement with the roller stud 67ᵇ in the forward extension of the link 67. Ordinarily forward rocking of the full stroke sector 69 is accompanied by movement of the link 67 and its said stub 67ᵇ will strike the finger 408 and stretch the spring 406, said stud wiping past the finger and the latter then taking up a position in rear of the stud so that upon the return movement the finger will be forced rearward against the stress of a spring 410 applied to a forward extension thereof. The link 407 has a shoulder 407ᵃ extending in front of a stud 403ᵇ on an extension of the arm 403. Consequently when the said finger is so forced rearward the yoke of which the arm 403 forms a part is also carried rearward and whichever one of the keys 10 or 11 is depressed will be released near the close of the operation.

As above stated the use of the non-print key will be desirable in the case of multiplying by repeated addition. In this connection it will be noted that when the repeat key is depressed the link 67 is disconnected from the full stroke sector as before explained. Consequently the stud 67ᵇ will not act to release the non-print key so long as the repeat key is down. This avoids the necessity of depressing the non-print key for repeated operation and so facilitates the performance of multiplication without repeatedly printing the multiplicand.

For releasing either the non-add key or the non-print key when it has erroneously been depressed, connections are provided from the error key 6. It will be remembered that the latter rocks the shaft 91. To this shaft is secured an arm 420, Fig. 3, which is connected by a link 421 with the forwardly extending arm of a cam lever 422 pivoted upon the shaft 320 and adapted to act upon the stud 403ᵇ to throw the detent yoke rearward.

The spring 410 is superior to the spring 406 so as to expand the latter under normal conditions sufficiently to enforce engagement of the detent with the keys.

Special printing to designate non-added numbers, sub-totals and totals.

It is desirable on the printed record to be able to distinguish at a glance between listed numbers or amounts which are added, designating numbers or the like which are not added, sub-totals and totals. To this end special means are provided in the present instance to cause printing of designating characters to distinguish between these different records of numbers and amounts. Referring to Fig. 3 the numeral 500 designates a special type carrier similar in construction to the type carriers hereinbefore mentioned and carrying three types 501 the upper one of which serves for designating non-added numbers, the middle one of which serves for designating a sub-total and the lower one of which serves for designating a grand or clearing total. This special type carrier is at the upper end of a slide bar 502 similar to the slide bars 15 and guided in the same manner for vertical movement. A spring 503 normally tends to elevate the slide bar and is normally restrained by a cross rod 504 extending between rearward extensions 114ᶜ of the rack restoring frame, the before-mentioned roller 308 being upon said rod. There is hung upon a frame cross rod 507 an indexing yoke one arm, 508, of which is formed with three stepped shoulders $a$, $b$, $c$. Normally the lowermost shoulder $a$ stands directly above a stud 502ᵃ on the slide bar to measure the rise of the latter for positioning at the printing line the number sign or elimination type. A special hammer 510 is provided for acting upon the special type and it is controlled similarly to the hammers already described, in so far as retraction by the bail rod 304 is concerned and detention by the yoke cross bar 310. Furthermore there is a hook 511 similar to the before described hooks 315, and this hook 511 is adapted to engage with the hammer 510 to restrain the latter as the hooks 315 restrain the other hammers, though this hook 511 is differently controlled. It is retracted by the same bail cross rod 316 that retracts the other hooks but it is controlled in different ways by the non-print or elimination key and the total and sub-total keys and it does not have any such relation with the other hooks 315 as they have among themselves through the overlapping tails 315ᵈ. This hook 511 has a rearwardly extending arm 512 with a laterally projecting stud 513 and a downwardly extending finger 514. The stud stands normally just in rear of a finger 515 on a movable bar 516 which is slotted at the rear for engagement with a guiding stud 517 and is slotted at the front for guiding engagement with the frame cross rod 401, Fig. 3. This bar has a downward extension at the front with an inclined slot 518 into which protrudes a stud 520 on the non-add key. Depression of the latter shifts the said bar 516 rearward putting its finger 515 under the stud 513 for the purpose of blocking the hook 511 and permitting the hammer 510 to drive against the non-add or elimination type.

The before-mentioned indexing yoke is connected with the total and sub-total keys so that it may be swung to bring either the shoulder $b$ or the shoulder $c$ over the stud 502ᵃ. An arm 508ᵃ of the said yoke is connected by a link 525 with a rocker piece 526 which has a segmental outer portion normally standing just in rear of the finger 514. Whenever either the total or sub-total key is depressed this rocker piece is swung forward to throw such portion thereof under said finger and block the hook 511 so that the hammer 510 may fire. This rocker piece is normally held rearward against the stud 527 by a spring 528.

A link 529 connects said rocker piece with an arm 530 loosely mounted upon the shaft 142 which as hereinbefore described is rocked by depression of either the total or sub-total key. The pivot stud 529ᵃ connecting the link 529 and arm 530 is extended for the engagement therewith of a finger 531 on the yoke 173 loose on the shaft 142 and operated by the sub-total key, Fig. 20. The extent of movement imparted through this engagement to the arm 530 and connected parts is such as to position the indexing shoulder b above the stud 502. In the subsequent operation therefore the special type carrier may rise to a position where the sub-total type is brought to the printing line.

The aforesaid arm 530 extends beyond the point of union with the link 529 and has another stud 540 which is adapted to be acted upon by a finger 541 secured to the shaft 142, and when the total key is depressed and this shaft rocked said finger acts upon said stud to move the arm 530 an extent sufficient to position the remaining indexing shoulder c above the stud 502 so as to permit the type carrier to rise to the third position where it presents at the printing line the type for designating a grand total. While as before explained the sub-total key also rocks the shaft 142 and would therefore move said arm 541, this would not result in setting the indexing arm in this third position, for the reason that there is lost motion between the sub-total key stud 170ª and the arm 182 (Fig. 1).

Driving mechanism.

The full stroke sector 69 which has before been mentioned as rotatively secured to the handle shaft 14ª, is connected by a cross rod 69ᵇ with an arm 69ᶜ which is secured to the same hub as the full stroke sector and has a branch 69ᵈ extending in front of a stud 134ª which unites the arm 134 with a companion arm 134ᵇ; all as shown in Figs. 6 and 7. A spring 800 connects the cross rod 69ᵇ with an overhead frame cross rod and constitutes the main spring of the machine against which the handle is pulled forward and which spring upon release of the handle supplies power to restore the parts to normal. The full stroke sector has the usual notched periphery for coöperation with a full stroke pawl 801.

As is customary in machines of this type the handle shaft operates through a spring transmission to impart movements to various departments of the machine under regulation of a dash-pot to secure the proper timing in action. A rearwardly extending branch 69ᵉ of the full stroke sector is pivotally connected to a link 803 which extends vertically and is pivotally connected at its upper end to an arm 804 loosely journaled upon a frame cross rod 805. On this same cross rod is journaled a longer arm 806 which at its rear end is pivotally connected to a piston rod 807 of a dash-pot whose cylinder 809 is pivotally mounted at its lower end on suitable supports in the framework of the machine. A link 810 is pivoted to the arm 806 and extends downward parallel with the link 803 to which it is connected by a spring 812, the latter being coupled at its upper end to a stud 813 on the link 803 and at its lower end to a stud 814 on the link 810. The latter link near its lower end is pivotally connected to an angular extension 134ᶜ of the before-mentioned arm 134, the companion arm 134ᵇ having a similar extension 134ᵈ and the link being engaged by a bolt which connects these two extensions, Fig. 7. The said arm 134 and companion arm 134ª are secured to the same hub which is loose upon the shaft 14ª. It will be obvious that through the connections described the arm 134 is yieldingly driven by forward pull of the handle shaft and returned by the spring 800 through action of the arm 69ᵈ against stud 134ª; all under regulation of the dash-pot. Said stud 134ª carries a roller 114ᵍ between the arms 134 and 134ᵇ, (Fig. 7), and there is secured to the rock shaft 102 an angular arm 114ʰ having a cam slot 114ⁱ embracing said roller. It will be obvious that this construction provides for reciprocation of the rack restoring frame.

The full stroke sector should not start on its return swing until the parts driven through the spring transmission have completed their initial movements and hence, as is customary in this class of machines, I provide for locking the sector against premature return. This is accomplished by the use of a toggle joint comprising a member 820 pivoted to the sector and jointed to another member 821 on a shaft 822, this other member having a radial shoulder e. Above the shaft 822 is another shaft 823 carrying a toggle-breaking member 825 having a radial shoulder f adapted to strike the shoulder e and break the toggle when the driven parts have completed their initial movements. The member 825 has a weighted upper end portion 825ª and a lateral lip g at the upper extremity which normally engages the shoulder of a latch 830, the engagement being enforced by a spring 831. The latch extends rearwardly and has a terminal foot h standing in the path of a roller stud i on the link 810. A spiral spring 832 connects an upper portion of the link 810 with a rearwardly extending finger 825ᵇ of the member 825, which finger is normally engaged by the roller stud i as shown in Fig. 6. In operation the toggle joint is straightened as the full stroke sector reaches the end of its initial movement, an extension of the toggle member 820 striking the shaft 822. The shoulder e has passed by and stands in the path of movement of the shoulder f but there is no contact between these shoulders until the member 825 is released. That takes place when the driven link 810 reaches the end of its movement and acts against the latch 830 disengaging it from the member 825. The spring 832 has meantime been put under considerable tension and the member 825 is immediately rocked and its shoulder *f* driven against the shoulder *e* breaking the toggle and permitting the main spring 800 to act in restoring the parts to normal.

*Interlocking mechanism.*

For the purpose of safeguarding the machine against damage or derangement several interlocks are provided between the operating handle and controlling keys, as follows: First the amount keys coöperate with means for preventing depression of more than one of them at a time. Thus on a vertical transverse frame plate 5ª there are pivoted a series of swinging lock pieces 5ᵇ having double bevel formations at their lower widened ends. The key levers 28 extend between these lock pieces as illustrated in Fig. 36 and when any key lever is depressed it spreads them apart moving portions thereof under the other key levers so as to prevent depression thereof, it being understood that these lock pieces are only free to swing an extent corresponding with the thickness of a key lever. The said lock pieces are also affected by pulling of the operating handle 14, it being desirable to prevent depression of amount keys or repeat or back space keys after the handle has started. To this end a lever 14ᶜ extends past an end lock piece 5ᶜ so that when depressed it will have the same effect upon the lock pieces as depression of one of the key levers 28, see Fig. 36. Said lever is pivoted at its rear end upon a frame stud 14ᵈ and has a lower branch pivotally connected to a link 14ᵉ. The latter is widened at its rear end and formed with an arc-shaped slot 14ᶠ which is engaged by a stud 69ᶠ on a branch of the full stroke sector 69 as shown in Fig. 35. A spring 14ᵍ applied to an upper arm 14ʰ of the lever 14ᶜ tends to rock the lever but is normally restrained by the engagement of the end of the slot 14ᶠ with said stud 69ᶠ. However, when the handle is pulled the sector 69 is rocked and said stud permits said spring to act and force the lever down into engagement with the said end lock piece 5ᶜ with the effect of locking the amount keys and also the above mentioned special keys. The end lock piece 5ᶜ has an upward forked extension 5ᵉ for coöperation with a lug 7ª on the repeat key stem. The extremities of the tines of this fork approach each other as shown in Fig. 36 leaving a passageway just sufficient for said lug to pass through. Consequently when this lock piece 5ᶜ is tilted by the lever 14ᶜ or by depression of an amount key the repeat key will be blocked by reason of one tine or the other being in the path of its lug. There is another special lock piece 5ᶠ which has an upward forked extension for coöperation with the back space key 900. There is pivoted to the lever 902 of said key a bar 915 which is slotted to embrace a guiding frame stud 916, Fig. 35, and has a forward extension presenting a lug 917 above the said forked extension of said lock piece 5ᶠ. The slot of this forked extension is approximately the width of said lug and normally extends in line therewith. When the lock pieces are tilted either way the lug will be blocked and consequently the back space key cannot be depressed. It is obvious that besides providing for prevention of depression of either the repeat or the back space key after the handle has been started in operation, the above described construction provides for preventing simultaneous depression of either the repeat or back space key and an amount key.

The branch 14ʰ of the lever 14ᶜ normally stands directly in the path of a lug 69ᵉ on the full stroke sector as shown in Fig. 35, though spaced sufficiently therefrom to permit its swinging out of the way before the stud reaches it in the event that it is free to do so. However, if a key is depressed at the time, the lever 14ᶜ will be blocked by the lock piece 5ᶜ and so the spring 14ᵍ will be prevented from swinging said arm 14ᵏ out of the path of the lug and the handle will be blocked compelling release of the depressed key before the machine can be operated. The situation is a little different with regard to the repeat key as of course the machine is to be operated with that key depressed. However, it should not be operated until the key has been fully depressed. It was before described that the tines of the forked extension 5ᵉ of the lock piece 5ᶜ approached each other at their upper ends. Below these particular portions of the tines the slot between them is wide enough to permit tilting of the lock piece notwithstanding the lug 7ª is between the tines. It is only while the lug is passing through the throat formed by the end portions of the tines that the lock piece is prevented from tilting and the handle thus blocked as well as other keys.

What I claim is:

1. In a machine of the character described, the combination of differentially reciprocable accounting elements; a carriage shiftable transversely thereof and having denominational series of stops or controlling devices each series numbering less than the differential positions of an accounting element which are controlled by the devices of the series; and keys and connections between the same and the controlling devices whereby one controlling device may serve for more than one position of the accounting element.

2. In a machine of the character described, the combination of differentially reciprocable accounting elements with graduated abutments; a carriage having several series of movable stops for the latter, the same series of stops adapted to coöperate with different abutments of an accounting element; manipulative amount determining means for differently setting any one of said stops; means for shifting the carriage, and means for operating the accounting elements.

3. In a machine of the character described, the combination of differentially reciprocable accounting elements with graduated abutments; a carriage having several series of movable stops for the latter, the same series of stops adapted to coöperate with different abutments of an accounting element; a set of depressible keys; a series of stop-setting devices; connections between the latter and the keys by pairs thereof, with provisions for differently setting a stop by different keys of a pair; means for shifting the carriage; and means for operating the accounting elements.

4. In a machine of the character described, the combination of differentially reciprocable accounting elements with graduated abutments; a carriage having several series of movable stops for the latter, the same series of stops adapted to coöperate with different abutments of an accounting element; a series of levers one for each stop of a series and having angular branches to act upon them respectively; a set of keys; independently operable connections from the keys in pairs to the said levers respectively with provision for differently setting the same stop by operation of different keys of a pair; means for shifting the carriage; and means for operating the accounting elements.

5. In a machine of the character described, the combination of differentially reciprocable accounting elements with graduated abutments; a carriage having several series of movable stops for the latter, the same series of stops adapted to coöperate with different abutments of an accounting element; a series of levers one for each stop of a series and having angular branches to act upon them respectively and unequal arms connected by nested yokes; a set of keys; levers one for each key and engaged in pairs with the unequal arms of the stop-setting levers; means for shifting the carriage; and means for operating the accounting elements.

6. In a machine of the character described, the combination of differentially reciprocable accounting elements with graduated abutments; a carriage having several series of movable stops for the latter, the same series of stops adapted to coöperate with different abutments of an accounting element; a series of stop-setting bell-cranks each having two operating arms of different lengths; a pair of levers for each bell-crank, the levers of a pair engaging the operating arms respectively of the latter; depressible keys engaging the levers respectively; means for shifting the carriage; and means for operating the accounting elements.

7. In a machine of the character described, the combination of differentially reciprocable accounting elements with graduated abutments; a carriage having several series of movable stops for the latter, the same series of stops adapted to coöperate with different abutments of an accounting element; manipulative amount determining means for differently setting any one of said stops; means for limiting movement of stops; connections for operating said latter means by certain members of the manipulative amount-determining means; means for shifting the carriage; and means for operating the accounting elements.

8. In a machine of the character described, the combination of differentially reciprocable accounting elements with graduated abutments; a carriage having several series of movable stops for the latter, the same series of stops adapted to coöperate with different abutments of an accounting element; a set of depressible keys; a series of stop-setting devices; connections between the latter and the keys by pairs thereof, with provisions for differently setting a stop by different keys of a pair; a limit piece for said stops to encounter; connections for operating said limit piece by certain of said keys; means for shifting the carriage; and means for operating the accounting elements.

9. In a machine of the character described, the combination of differentially reciprocable accounting elements with graduated abutments; a carriage having several series of movable stops for the latter, the same series of stops adapted to coöperate with different abutments of an accounting element; a series of stop-setting bell-cranks each having two operating arms of different lengths; a pair of levers for each bell-crank, the levers of a pair engaging the operating arms respectively of the latter; depressible keys engaging the levers respectively; a limit bar for the stops to encounter; operating connections between certain of the said levers and said bar; means for shifting the carriage; and means for operating the accounting elements.

10. In a machine of the character described, the combination of differentially reciprocable accounting elements with graduated abutments; a carriage having several series of movable stops for the latter, the same series of stops adapted to coöperate with different abutments of an accounting element; a series of levers one for each stop of a series and having angular branches to act upon them respectively; a set of keys; independently operable connections from the keys in pairs to the said levers respectively with provision for differently setting the same stop by operation of different keys of a pair; an obliquely slotted limit bar for the stops; a bail coupled to said bar and overlying the key levers one of each pair of which has a branch to operate the bail; means for shifting the carriage; and means for operating the accounting elements.

11. In a machine of the character described, the combination of differentially reciprocable accounting elements, a carriage having several series of movably mounted stops for measuring movement of said elements; manipulative means for selecting and setting said stops; means for shifting the carriage step by step; a fixed stop-locking member into engagement with which the stops are moved by the shifting of the carriage; and means for reciprocating the accounting elements.

12. In a machine of the character described, the combination of differentially reciprocable accounting elements; a carriage having several series of movably mounted stops to denominationally relate the same to the accounting elements; manipulative means for selecting and setting said stops; means for shifting the carriage step by step; a fixed stop-locking member into engagement with which the stops are moved by the shifting of the carriage, said member being in the form of a plate with tines to interlock with the stops; and means for reciprocating the accounting elements.

13. In a machine of the character described, the combination of differentially reciprocable accounting elements, a carriage having several series of movably mounted stops for measuring movements of said elements, each stop provided with notches spaced apart; manipulative means for selecting and setting said stops; means for shifting the carriage step by step to denominationally relate the same to the accounting elements; a fixed stop-locking member into engagement with which the stops are moved by the shifting of the carriage, said member being in the form of a plate with tines to engage the notches of the stops; and means for reciprocating the accounting elements.

14. In a machine of the character described, the combination of differentially reciprocable accounting elements with graduated abutments; a carriage having several series of movable stops for the latter, the same series of stops adapted to coöperate with different abutments of an accounting element and each stop having a series of notches; manipulative amount determining means for differentially setting any one of said stops; means for shifting the carriage; means for operating the accounting elements; and a fixed plate having tines to engage notches of the stops when the carriage shifts.

15. In a machine of the character described, the combination of differentially reciprocable accounting elements having abutment shoulders; a shiftable carriage having stop-fingers normally confronting said shoulders respectively; movable stops in said carriage; manipulative amount-determining means for variously setting said stops; carriage shifting means controlled by said manipulative means; an accumulator engageable with and disengageable from the aforesaid accounting elements; totaling means adapted to cause reverse turning of the accumulator to zero; and connections operated by said totaling means to retract the stop carriage positioning its stop fingers out of line with the shoulders of the accounting elements.

16. In a machine of the character described, the combination of slide bars having racks and stop shoulders and type; gear segments in mesh with the racks; gear sectors carried by the segments; accumulator wheels engageable with and disengageable from said sectors; means for reciprocating the slide bars; means for disengaging the sectors and accumulator wheels during advance of the slide bars and engaging the sectors and wheels during return movement of said bars; a total key and connections for reversing said order of engagement and disengagement; a shiftable carriage having stop fingers normally confronting the shoulders of the slide bars, and also having movable stop pins; keys and connections for setting the latter and shifting the carriage; and connections from the total key for retracting the carriage to position its stop fingers out of line with the shoulders.

17. In a machine of the character described, the combination of differentially reciprocable accounting elements having abutment shoulders; a shiftable carriage having stop-fingers normally confronting said shoulders respectively; movable stops in said carriage; manipulative amount-determining means for variously setting said stops; carriage shifting means controlled by said manipulative means; an accumulator engageable with and disengageable from the aforesaid accounting elements; totaling means adapted to cause reverse turning of the accumulator to zero; and connections operated by said totaling means to retract the stop carriage positioning its stop fingers out of line with the shoulders of the accounting elements, said connections comprising a stud on the carriage; a cam piece to act on the stud, a link coupled to the cam piece, a rock shaft cranked to the link, and an arm secured to said shaft and operated upon by the totaling means.

18. In a machine of the character described, the combination of differentially reciprocable accounting elements having abutment shoulders; a shiftable carriage having stop-fingers normally confronting said shoulders respectively; movable stops in said carriage; manipulative amount-determining means for variously setting said stops; carriage shifting means controlled by said manipulative means; an accumulator engageable with and disengageable from the aforesaid accounting elements; totaling means adapted to cause reverse turning of the accumulator to zero; and connections operated by said totaling means to retract the stop carriage positioning its stop fingers out of line with the shoulders of the accounting elements, said connections comprising a stud on the carriage; an oscillating notched cam blade, a link coupled thereto, a rock shaft cranked to the link, and an arm secured to said shaft and operated upon by the totaling means.

19. In a machine of the character described, the combination of differentially reciprocable accounting elements; a carriage having several series of movably mounted stops; manipulative means for selecting and setting said stops; means for shifting the carriage step by step; means for reciprocating the accounting elements; a spring for retracting the carriage; means for tensioning said spring by said reciprocating means, a detent for restraining the spring; and means for tripping the detent at the conclusion of operation of said reciprocating means.

20. In a machine of the character described, the combination of differentially reciprocable accounting elements; a carriage having several series of movably mounted stops; manipulative means for selecting and setting said stops; means for shifting the carriage step by step; means for reciprocating the accounting elements; a spring-held arm having a pawl to engage the carriage for retracting it; a one-way driving connection between said arm and the said reciprocating means; a detent for restraining said arm; and means for tripping said detent at the conclusion of operation of said reciprocating means.

21. In a machine of the character described, the combination of differentially reciprocable accounting elements; a carriage having several series of movably mounted stops; manipulative means for selecting and setting said stops; means for shifting the carriage step by step; means for reciprocating the accounting elements; a spring and catch connections for retracting the carriage; means for setting said connections and tensioning said spring by said reciprocating means through separable engagement therewith; a detent for restraining the spring; means for tripping the detent at the conclusion of operation of said reciprocating means, and a key and connections associated with but operable independently of both said retracting spring and its catch connections, and said setting and tensioning means, for restoring said carriage to normal.

22. In a machine of the character described, the combination of differentially reciprocable accounting elements; a carriage having several series of movably mounted stops; manipulative means for selecting and setting said stops; means for shifting the carriage step by step; means for reciprocating the accounting elements; a spring-held arm having a pawl to engage the carriage for retracting it, the pawl being spring-actuated for engagement with the carriage and there being a fixed abutment normally restraining the spring; a one-way driving connection between said arm and the said reciprocating means; a detent for restraining said arm; and means for tripping said detent at the conclusion of operation of said reciprocating means.

23. In a machine of the character described, the combination of differentially reciprocable accounting elements; a carriage having several series of movably mounted stops; manipulative means for selecting and setting said stops; means for shifting the carriage step by step; means for reciprocating the accounting elements; a spring-held arm having a pawl to engage the carriage for retracting it, the pawl being spring-actuated for engagement with the carriage and there being a fixed abutment normally restraining the spring; a one-way driving connection between said arm and the said reciprocating means; a detent for restraining said arm; means for tripping said detent at the conclusion of operation of said reciprocating means; a second arm associated with the before-mentioned spring-held arm but operable independently thereof and of the one-way driving connection, to restore the carriage; and a key and connections for reciprocating said second arm.

24. In a machine of the character described, the combination of differentially reciprocable accounting elements; a carriage having several series of movably mounted stops; manipulative means for selecting and setting said stops; means for shifting the carriage step by step; means for reciprocating the accounting elements; a spring-held arm having a pawl to engage the carriage for retracting it; a one-way driving connection between said arm and the said reciprocating means; a rack on the carriage;

a detent normally disengaged from the rack and so held by the reciprocating means but adapted to engage the rack upon initial movement of the latter, and to be again disengaged upon return of the said means to normal.

25. In a machine of the character described, the combination of accumulating mechanism; printing mechanism; setting up mechanism; setting up mechanism restoring means; means for disabling the printing mechanism; and means for disabling the said restoring means and controlling release of the means for disabling the printing mechanism.

26. In a machine of the character described, the combination of accumulating mechanism; printing mechanism; setting-up mechanism-restoring means; a key and connections for disabling the printing mechanism; means for latching down said key; means for unlatching the same; a repeat key; and means controlled thereby for preventing the unlatching of the non-print key.

27. In a machine of the character described, the combination of accumulating mechanism; printing mechanism; setting up mechanism; setting up mechanism restoring means; a key and connections for disabling the printing mechanism; a detent for said key; means for automatically releasing the key from the detent; and a key and connections for disabling the setting up mechanism restoring means and simultaneously disabling said means for automatically releasing the detent.

28. In a machine of the character described, the combination of differentially reciprocable accounting elements; a carriage having several series of movably mounted stops; manipulative means for selecting and setting said stops and for shifting the carriage from numerical order to numerical order including a cipher key; a counter to show the number of operations of the accounting elements; and means for resetting the counter by the cipher key.

29. In a machine of the character described, the combination of differentially reciprocable accounting elements; a carriage having several series of movably mounted stops; manipulative means for selecting and setting said stops and for shifting the carriage from numerical order to numerical order, including a cipher key; a counting wheel; ratchet and pawl mechanism for turning it; a detaining pawl; a spring for resetting the wheel; and means for tripping the detaining pawl by the cipher key.

30. In a machine of the character described, the combination of differentially reciprocable accounting elements; a carriage having several series of movably mounted stops; manipulative means for selecting and setting said stops and for shifting the carriage from numerical order to numerical order, including a cipher key; a counter to show the number of operations of the accounting elements; means for resetting the counter by the cipher key; and a correction key with connections for resetting the counter.

31. In a machine of the character described, the combination of differentially reciprocable accounting elements; a carriage having several series of movably mounted stops; manipulative means for selecting and setting said stops and for shifting the carriage from numerical order to numerical order, including a cipher key; a counting wheel; ratchet and pawl mechanism for turning it; a detaining pawl; a spring for resetting the wheel; means for tripping the detent pawl by the cipher key; and a correction key with connections for tripping said detaining pawl.

32. In a machine of the character described, the combination of accumulating mechanism; setting up mechanism; setting up mechanism restoring means; means for disabling the latter; and means for counting operations of the accumulating mechanism; said means rendered operative by the means for disabling the setting up mechanism restoring means.

33. In a machine of the character described, the combination of differentially reciprocable accounting elements; a carriage having several series of movably mounted stops; manipulative means for selecting and setting said stops and for shifting the carriage from numerical order to numerical order; carriage and stop restoring means; means for disabling the latter; means for counting operations of the accounting elements; and means for bringing said latter means into play by the aforesaid disabling means.

34. In a machine of the character described, the combination of differentially reciprocable accounting elements; a carriage having several series of movably mounted stops; manipulative means for selecting and setting said stops and for shifting the carriage from numerical order to numerical order, including a cipher key; carriage and stop restoring means; means for disabling the latter; means for counting operations of the accounting elements, and means for bringing said latter means into play by the aforesaid disabling means; together with means for resetting the counter by the cipher key.

35. In a machine of the character described, the combination of accumulating mechanism; setting up mechanism; setting up mechanism restoring means; a key and connections for disabling the latter; a counting wheel; ratchet and pawl mechanism for turning the same; and means for rendering said latter mechanism operative by the said key.

36. In a machine of the character described, the combination of amount keys, a laterally shiftable stop carriage, escapement means and stop setting means operated by said keys, reciprocating actuators whose movements are measured by the set stops, racks operated by said actuators with provisions for limited relative movement to effect carrying, adding wheels engageable with and disengageable from said racks, carrying mechanism controlled by lower order wheels and controlling relative movement between racks and actuators, a total key or keys and connections for changing the period of engagement of wheels and racks, a lock for said key rendered effective by the amount keys and maintained effective by the stop carriage, and means for unlocking the total key when the latter is at normal.

37. In a machine of the character described, the combination of amount keys, a laterally shiftable stop carriage, escapement means and stop setting means operated by said keys, reciprocating actuators whose movements are measured by the set stops, racks operated by said actuators with provisions for limited relative movement to effect carrying, adding wheels engageable with and disengageable from said racks, carrying mechanism controlled by lower order wheels and controlling relative movement between racks and actuators, a total key or keys and connections for changing the period of engagement of wheels and racks, a locking bar for said key, a spring to move said bar to locking position, a rocking structure coupled to said bar and engaged by the stop carriage when out of its normal position, a latch for said rocking structure, connections for tripping the latch by the amount keys, a prime mover, and connections of yielding nature between the same and the rocking structure for retracting the locking bar.

38. In a machine of the character described, the combination of amount keys, a laterally shiftable stop carriage, escapement means and stop setting means operated by said keys, reciprocating actuators whose movements are measured by the set stops, racks operated by said actuators with provisions for limited relative movement to effect carrying, adding wheels engageable with and disengageable from said racks, carrying mechanism controlled by lower order wheels and controlling relative movement between racks and actuators, a total key or keys and connections for changing the period of engagement of wheels and racks, a locking bar for said key, a spring to move said bar to locking position, a rocking structure coupled to said bar and engaged by the stop carriage when out of its normal position, a latch for said rocking structure, connections for tripping the latch by the amount keys, a prime mover, and a thrust bar having lost-motion engagement with the prime mover and slot and pin and spring connection with the rocking structure.

39. In a machine of the character described, the combination of denominational racks and means for differentially reciprocating them; adding wheels in a movable support and means for engaging them with and disengaging them from the racks; and transfer mechanism comprising pawls tripped by lower order wheels, latches for detaining the pawls, and means for imparting one-step movements to higher order wheels as a result of tripping and latching of pawls; the latches being directly controlled by the movable support for the adding wheels whereby disengagement of the latter from the racks is accompanied by unlatching of the pawls.

40. In a machine of the character described, the combination of reciprocating rack-actuators and racks spring-connected with lost-motion between them; adding wheels in a support movable to engage them with and disengage them from the racks; transfer pawls normally restraining the racks and adapted to be tripped by lower order wheels; and latches for detaining tripped pawls, said latches engaged by the adding wheel support whereby the pawls are unlatched by the disengagement of the wheels from the racks.

41. In a machine of the character described, the combination of reciprocating racks; adding wheels; a shifting support for said wheels, a reciprocating member having a cam strip and cam flanges; a controlling arm having a stud to coöperate with said flanges and said strip and having a lost-motion connection with the adding wheel support; a latch for detaining said arm; and a thrust piece to displace the latch under actuation by the aforesaid reciprocating member.

42. In a machine of the character described, the combination of reciprocating racks; adding wheels; a shifting support for said wheels; a reciprocating member having a cam strip and cam flanges; a controlling arm having a stud to coöperate with said flanges and said strip and having a lost-motion connection with the adding wheel support; a latch for detaining said arm and a thrust piece to displace the latch under actuation by the aforesaid reciprocating member; the lost-motion connection between the controlling arm and the adding wheel support comprising a stud on the latter and a closed slot in the former whereby the wheels are held in mesh with the racks while the cam strip passes over the stud of said arm.

43. In a machine of the character described, the combination of reciprocating racks; adding wheels; a shifting support for said wheels; a reciprocating member having a cam strip and cam flanges; a controlling arm having a stud to coöperate with said flanges and said strip and having a lost-motion connection with the adding wheel support; a latch for detaining said arm; and a thrust piece to displace the latch under actuation by the aforesaid reciprocating member; together with a key and connections for displacing the thrust piece to eliminate adding by keeping the controlling arm latched.

44. In a machine of the character described, the combination of reciprocating racks; adding wheels; zero stops therefor; a shifting support for said wheels; a reciprocating member having a cam strip and cam flanges; a controlling arm having a stud to coöperate with said flanges and said strip and having a lost-motion connection with the adding wheel support; a latch for detaining said arm; and a thrust piece to displace the latch under actuation by the aforesaid reciprocating member; together with a subtotal key and connections for tripping the latch and holding it tripped.

45. In a machine of the character described, the combination of reciprocating racks; adding wheels; zero stops therefor; a shifting support for said wheels; a reciprocating member having a cam strip and cam flanges; a controlling arm having a stud to coöperate with said flanges and said strip and having a lost-motion connection with the adding wheel support; a latch for detaining said arm; and a thrust piece to displace the latch under actuation by the aforesaid reciprocating member; together with a total key and connections for displacing the latch and the thrust-piece with provisions for restoration of the latch by the reciprocating member at the end of its initial stroke.

46. In a machine of the character described, the combination of reciprocating racks; adding wheels; zero stops therefor; a shifting support for said wheels; a reciprocating member having a cam strip and cam flanges; a controlling arm having a stud to coöperate with said flanges and said strip and having a lost-motion connection with the adding wheel support; a latch for detaining said arm; a thrust piece to displace the latch under actuation by the aforesaid reciprocating member; a total key; an arm acted upon thereby; a rock shaft to which said arm is secured; an arm on said shaft acting to displace the thrust piece; a tappet piece loose in the rock shaft, and engaging the latch and adapted to be acted upon by the reciprocating member; and an arm secured to the rock shaft and connected by a spring to said tappet piece.

47. In a machine of the character described, the combination of reciprocable type-carriers, keys and connections for determining extent of movement thereof, printing hammers, a latching bail common to and normally restraining them, individual latches for said hammers normally disengaged from the latter, means for intercepting said latches by movement of the type carriers beyond a predetermined extent from normal, a prime-mover, and means operated thereby for first releasing the latches and then tripping the latching bail.

48. In a machine of the character described, the combination of reciprocable type-carriers, keys and connections for determining extent of movement thereof, printing hammers, a latching bail common to and normally restraining them, individual latches for said hammers normally disengaged from the latter and interengaged for holding back of one by another, means for intercepting said latches by movement of the type-carriers beyond a predetermined extent from normal, a prime-mover, and means operated thereby for first releasing the latches and then tripping the latching bail.

49. In a machine of the character described, the combination of a special type carrier tending to move to printing position; a prime mover normally restraining it; a stepped stop piece settable to differentially measure movement of said type carrier; a printing hammer; a latch normally disengaged therefrom but tending to engage it; an obstructing member normally out of line with a coacting part of the hammer; a connection between said member and the stepped stop piece; special keys; and separate connections between them and said obstructing member for differentially setting the same.

ALLEN A. HORTON.

Witnesses:
ARTHUR W. FENZEL,
F. E. RINSCHE.